US010218597B1

(12) United States Patent
Miller et al.

(10) Patent No.: US 10,218,597 B1
(45) Date of Patent: Feb. 26, 2019

(54) PROVIDER NETWORK ADDRESS RANGE-BASED MODELS

(71) Applicant: Amazon Technologies, Inc., Seattle, WA (US)

(72) Inventors: Kevin Christopher Miller, Fairfax, VA (US); Joseph E. Magerramov, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 83 days.

(21) Appl. No.: 14/869,902

(22) Filed: Sep. 29, 2015

(51) Int. Cl.
*H04L 12/26* (2006.01)
*H04L 29/12* (2006.01)

(52) U.S. Cl.
CPC ...... *H04L 43/0876* (2013.01); *H04L 61/2007* (2013.01)

(58) Field of Classification Search
CPC . H04L 41/12; H04L 12/4641; H04L 41/0803; H04L 45/02; H04L 41/5096; H04L 41/0806; H04L 63/0272; H04L 67/10
See application file for complete search history.

(56) References Cited

U.S. PATENT DOCUMENTS

| 7,606,895 | B1 | 10/2009 | Dini et al. |
| 8,504,688 | B2 | 8/2013 | Kullos |
| 8,510,420 | B1 * | 8/2013 | Brandwine ......... H04L 41/5051 370/398 |
| 8,996,691 | B1 | 3/2015 | Stickle et al. |
| 9,032,070 | B1 | 5/2015 | Stickle et al. |
| 9,166,992 | B1 | 10/2015 | Stickle et al. |
| 9,509,524 | B2 * | 11/2016 | Lewis ................. G06Q 10/04 |
| 2003/0110252 | A1 | 6/2003 | Yang-Huffman |
| 2010/0020685 | A1 * | 1/2010 | Short ..................... H04L 12/14 370/230 |
| 2012/0084146 | A1 * | 4/2012 | Zwicky ................ G06Q 30/02 705/14.47 |
| 2015/0358205 | A1 | 12/2015 | Brophy |

* cited by examiner

*Primary Examiner* — Asad M Nawaz
*Assistant Examiner* — Zhaohui Yang
(74) *Attorney, Agent, or Firm* — Robert C. Kowert; Meyertons, Hood, Kivlin, Kowert & Goetzel, P.C.

(57) ABSTRACT

Methods and apparatus for providing rating and usage models for IP traffic to and from clients' resource instances in a provider network environment. A service provider may implement rating and usage models that may be used to associate provider network addresses with address ranges of external networks. The models may be provided to or selected by clients and applied to traffic between the clients' provider network addresses and the addresses of user devices that are in the address ranges of external networks associated with the models. Rating models may be applied to provider network clients' usage on the provider network resulting from the clients' customers' accesses of the clients' applications on resource instances in the provider network. Usage models may be applied to the clients' customers' usage on intermediate networks when accessing the clients' applications on resource instances in the provider network.

25 Claims, 14 Drawing Sheets

PROVIDER NETWORK ADDRESS RANGE-BASED MODELS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 1:
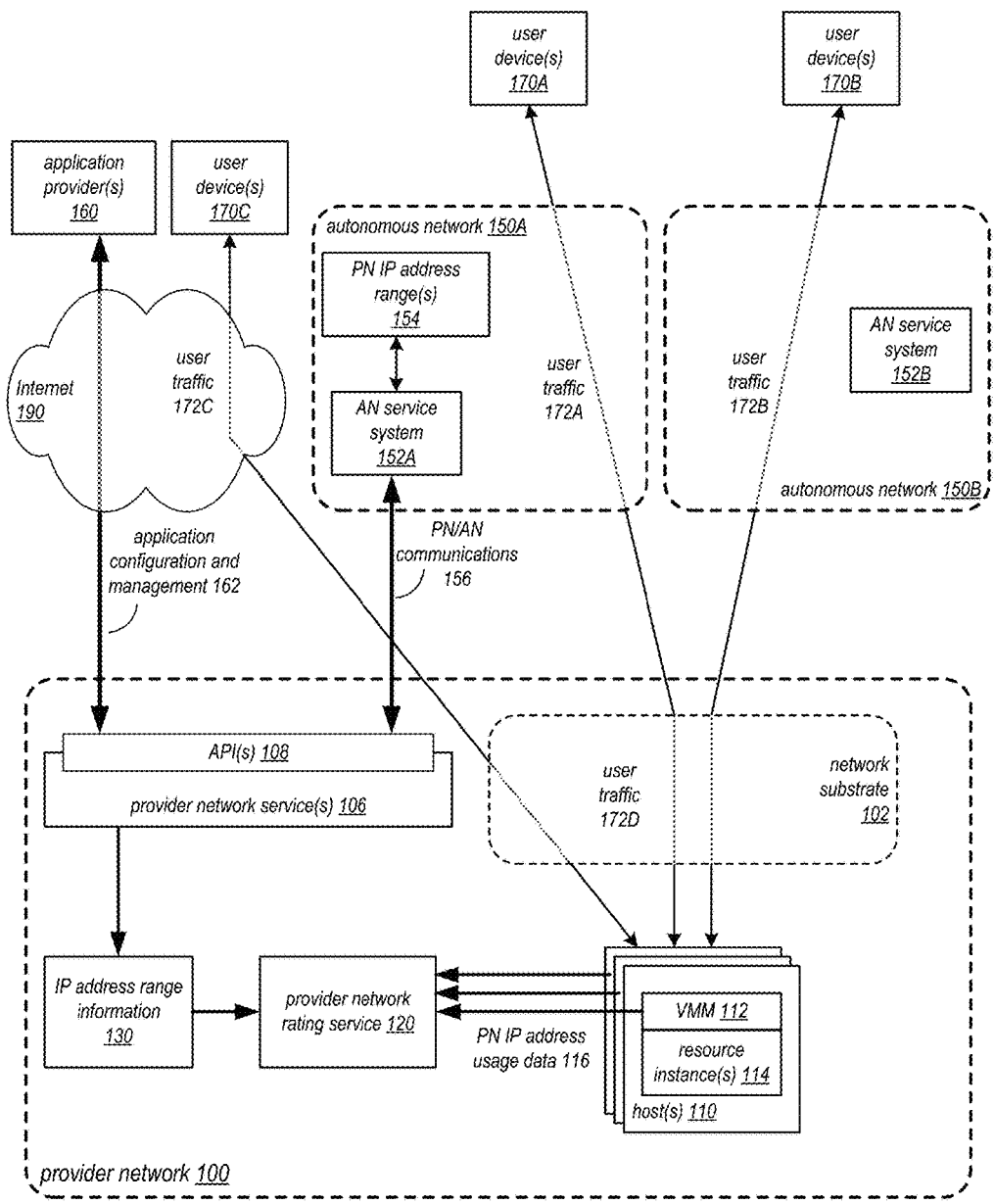
FIG. 1 illustrates a provider network environment in which rating and usage models for IP traffic to and/or from resource instances may be provided to clients, according to some embodiments.
Figure 2:
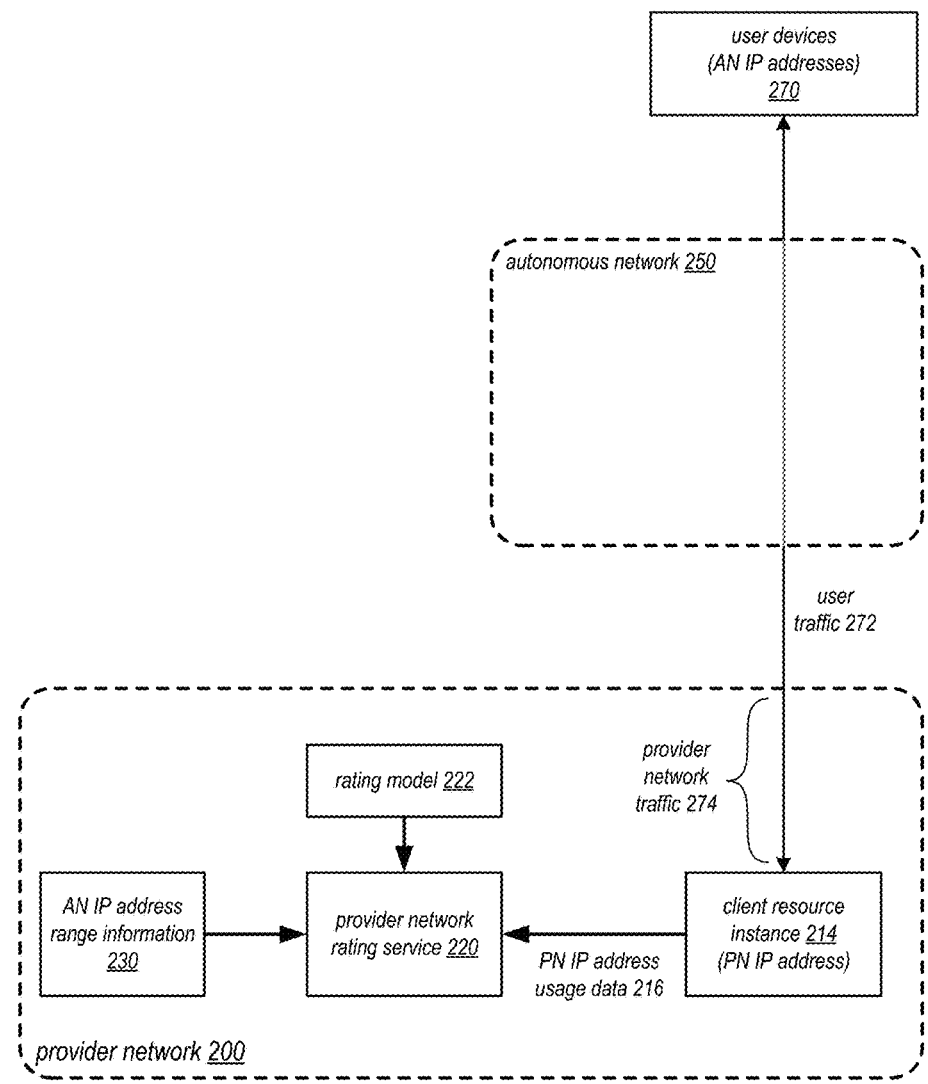
FIG. 2 illustrates a rating model applied to a client's resource instance in a provider network environment, according to some embodiments.
Figure 3:
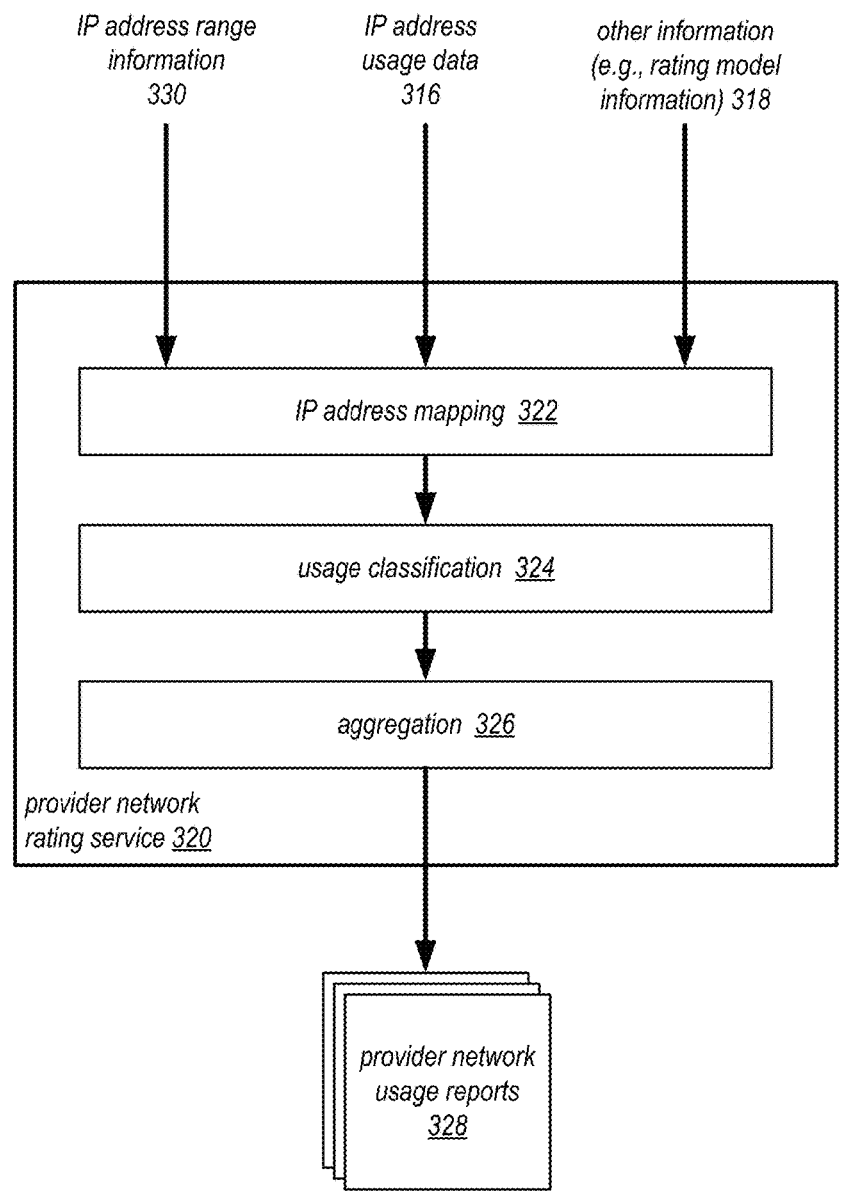
FIG. 3 illustrates a provider network rating service that rates provider network usage for clients' resource instances in a provider network environment, according to some embodiments.

Various embodiments of methods and apparatus for providing rating and usage models for IP traffic to and/or from clients' resource instances in a provider network environment are described. Embodiments of the methods and apparatus for providing rating and usage models for clients' resource instances may, for example, be implemented in the context of a service provider that provides to clients or customers, via an intermediate network such as the Internet, virtualized resources (e.g., virtualized computing and storage resources) implemented on a provider network of the service provider, typically in a data center of the service provider. A client's resource instances (e.g., endpoints such as computation resources, storage resources, servers, host devices, etc.) on a provider network may be assigned IP addresses (e.g., IPv4 or IPv6 addresses) within the provider network's address space. FIGS. 1 through 3 illustrate example provider network environments in which embodiments may be implemented. FIGS. 9 through 13 and the section titled Example provider network environments further illustrate and describe example service provider network environments in which embodiments may be implemented.

A provider network client may establish one or more resource instances on the provider network that implement an application, for example a game or video streaming service. The application may be made public so that customers of the client can access and use the application. A client's customers may include customers that access the application on the client's resource instance(s) via user devices external to the provider network through external networks (e.g., autonomous networks such as mobile service provider networks). The user devices may include computer systems (e.g., notebook computers, laptops, desktop computers, pad/tablet devices, etc.) that access the application on the provider network via an intermediate network such as the Internet. The user devices may also include mobile devices (e.g., smart phones, pad/tablet devices, etc.) that access the application on the provider network via autonomous networks such as mobile service provider networks. Customer usage plans with autonomous networks such as mobile service provider networks may generally be usage-based rather than flat rate-based. For example, a mobile service customer may pay some amount (e.g., $100 a month) for some amount of usage (e.g., 10 gigabytes (gB) per month).

Conventionally, customer traffic to and from IP addresses on an autonomous network when accessing a client's application at a provider network IP address of a resource instance in the provider network is monitored and rated separately from the client's provider network traffic to and from the provider network IP address that is generated by the customers' accesses of the client's application on the provider network. Components of external networks such as autonomous networks may monitor and rate network usage of customers, including the customers' network usage when accessing a provider network client's application on the client's resource instance via user devices through the external network. For example, a customer may be charged by an autonomous network provider for their usage of the autonomous network based on the network usage monitoring and rating, or the usage may be counted against their allocated usage amount according to their usage-based plan.

Conventionally, customers' usage on the external networks to and from a client's application on the provider network is monitored and rated just like traffic to any other endpoint. In addition, components of the provider network may monitor network usage to and from a client's application on a resource instance on the provider network from endpoints on and external to the provider network, including endpoints on the external networks such as the client's customers' user devices on autonomous networks. The client's provider network usage may be rated and aggregated by the components to generate provider network usage reports for the client. The provider network usage reports may, for example, be used in billing the client for their provider network usage according to a contract or agreement between the client and the service provider. Conventionally, traffic between a client's application on the provider network and IP addresses of the customer's clients on an autonomous network such as a mobile service provider network is monitored and rated just like traffic to any other endpoint.

Embodiments of rating and usage models are described for IP traffic to and/or from clients' resource instances in a provider network environment. A service provider that provides a provider network for clients may establish and implement rating and usage models that may be used to associate clients' provider network IP addresses with IP address ranges of autonomous networks such as mobile service provider networks. The service provider may provide services and application programming interfaces (APIs) that allow clients to specify or select rating and/or usage models for their resource instances on the provider network. A rating model, usage model, or combination thereof may be provided to or selected by a provider network client, and may be applied to network usage of the client's application on the client's provider network resource instance. The rating and usage models may be applied when monitoring and rating traffic between the client's provider network IP addresses and the IP addresses of the client's customers' user devices that are in the IP address ranges of autonomous networks associated with the models. Rating models may be applied to provider network clients' usage on the provider network resulting from the clients' customers' accesses of the clients' applications on resource instances in the provider network. Usage models may be applied to the clients' customers' usage on autonomous networks when accessing the clients' applications on resource instances in the provider network. A rating or usage model may be applied only to traffic from the clients' applications to the customers, only to traffic to the clients' applications from the customers, or to traffic in both directions.

In some embodiments, a rating model may be established by the service provider, and may be provided to or selected by a client for use with the client's resource instance(s). A rating model may be associated with IP address range(s) external to the provider network, for example IP address range(s) of one or more external networks such as autonomous networks. Once associated with the provider network IP address(es) of a client's resource instance(s), the rating model may be applied by components of the provider network (e.g., a rating service) when monitoring and rating provider network traffic between IP addresses within the IP address range(s) of external networks associated with the rating model and the provider network IP address(es) of the client's application on their resource instance(s).

In some embodiments, a usage model may be established by the service provider with a particular autonomous network provider such as a mobile service network provider, for example via negotiation, and once established may be provided to or selected by a client for use with the client's resource instance. A usage model may be associated with IP addresses or address range(s) of the provider network. The IP addresses or address range(s) of the provider network that are associated with the usage model may be provided to the autonomous network. A provider network IP address associated with the usage model may be assigned to the client's resource instance. The usage model may then be applied by components of the autonomous network when monitoring and rating network traffic on the autonomous network between the client's customers' user devices at IP addresses of the autonomous network and the provider network IP address assigned to the client's provider network resource instance.

Rating and usage models as described herein may associate IP address ranges of external networks with provider network IP addresses or address ranges to enable monitoring and rating of usage to be applied for provider network clients and/or their customers based on connections between the clients' customers' endpoints on the external networks and the clients' endpoints on the provider network. Thus, rather than having separate monitoring and rating of usage for the clients on the provider network and for the customers on the external networks as is conventionally done in provider network environments, with separate usage and billing models applied by the provider network to its clients and by the external networks to their customers for respective network usage, the rating and usage models allow the service provider and external networks to establish usage and billing models tailored for connections between endpoints on the provider network and IP address ranges of the external networks. For example, the service provider may establish a rating model that provides special usage benefits, for example free or reduced provider network usage charges, to clients for connections to customers on specific external networks, such as specific mobile service provider networks. As another example, the service provider may establish a usage model with a specific autonomous network provider, for example a mobile service provider, that provides special usage benefits to the mobile service provider's customers for traffic to and/or from provider network IP addresses within a specified range. A provider network client may then obtain a provider network IP address within that range so that customers that use the mobile service provider's network to access the provider network client's application can obtain the usage benefits provided by the usage model for traffic to and/or from the provider network client's application at that provider network IP address. For example, the mobile service provider may not count usage to that provider network IP address against the customers' usage plans.

Figure 8:
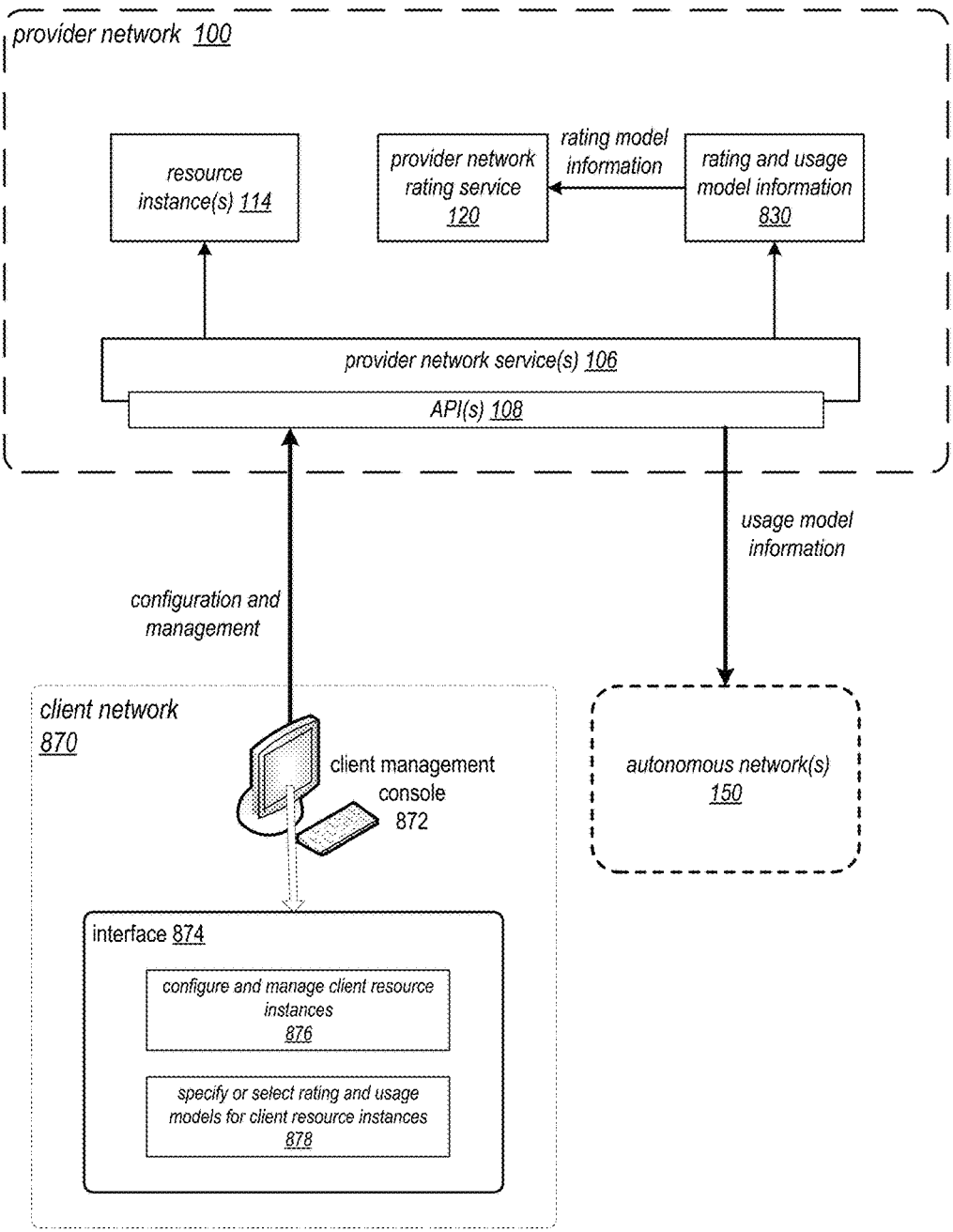
FIG. 8 illustrates provider network services and application programming interfaces (APIs) that may be used to select configure rating and usage models for a client's resource instances in a provider network environment, according to at least some embodiments.

FIG. 1 illustrates a provider network environment in which rating and usage models for IP traffic to and/or from resource instances may be provided to clients, according to some embodiments. Referring to FIG. 1, in at least some embodiments of a provider network 100, at least some of the resources provided to clients of a service provider via the provider network 100 may be virtualized computing resources implemented on multi-tenant hardware that is shared with other client(s) and/or on hardware dedicated to the particular client. Each virtualized computing resource may be referred to as a resource instance 114. Resource instances 114 may, for example, be rented or leased to clients of the service provider. For example, clients of the service provider (e.g., application provider(s) 160), via external device(s) (e.g., a management console 872 as illustrated in FIG. 8) coupled to the provider network 100 via an intermediate network such as the Internet 190, may access one or more services 106 of the provider network 100 via application programming interfaces (API(s)) 108 to the services 106 to obtain and configure provider network resource instances, including but not limited to computation resources and storage resources.

Figure 14:
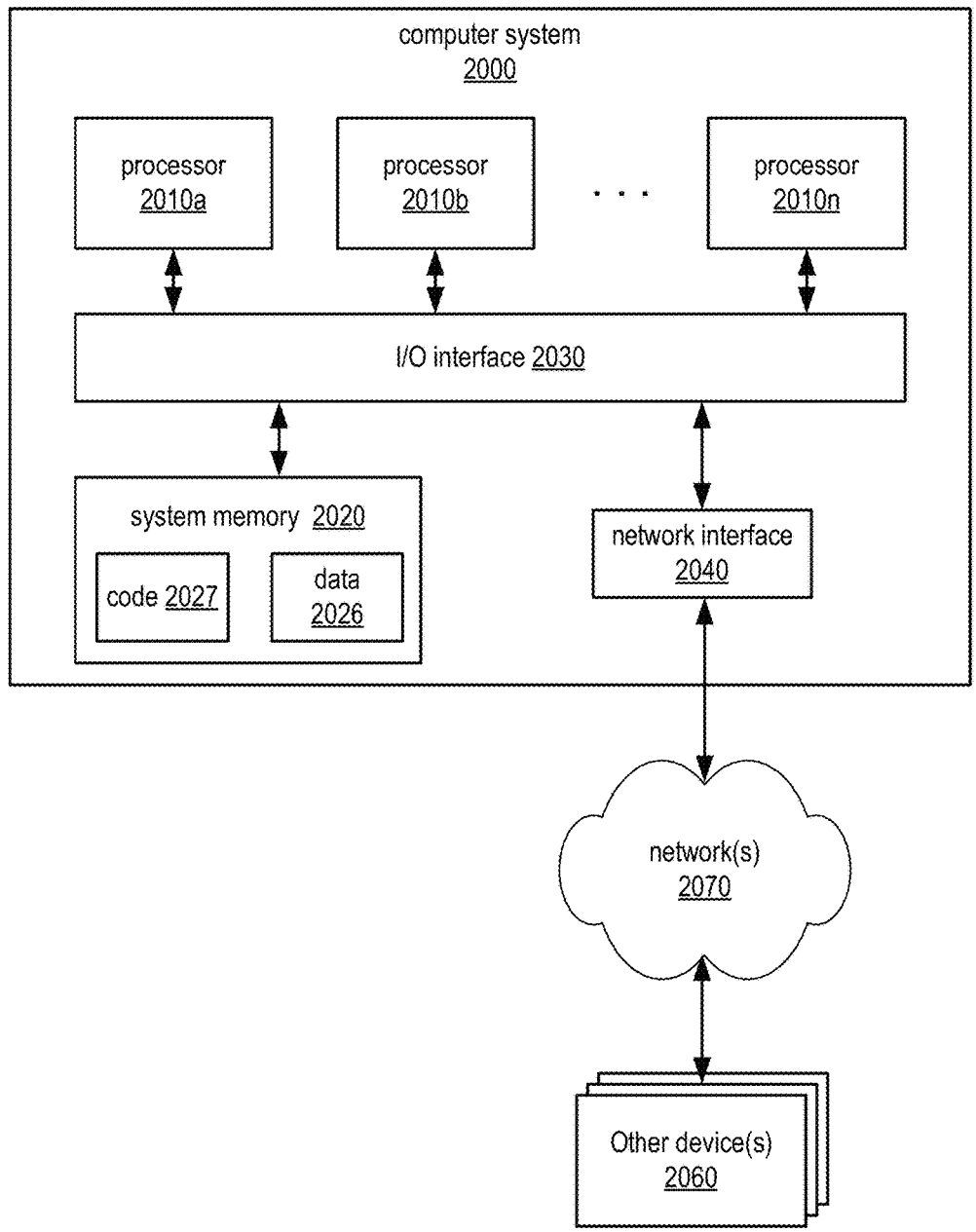
FIG. 14 is a block diagram illustrating an example computer system that may be used in some embodiments.

Referring to FIG. 1, at least some of the resource instances 114 on the provider network 100 may be implemented according to hardware virtualization technology that enables multiple operating systems to run concurrently on a host computer 100, i.e. as virtual machines (VMs) on the host 100. A hypervisor, or virtual machine monitor (VMM) 112, on the host 100 presents the client resource instances 114 on the respective host 100 with a virtual platform and monitors the execution of the client resource instances 114 on the host 100. Each client resource instance 114 may be provided with one or more IP addresses; the VMM 112 may be aware of the IP addresses of the client resource instances 114 on the host 100, and may route incoming client packets to and outgoing client packets from the client resource instances 114. For further information about hardware virtualization technology on a provider network, see FIG. 10. FIG. 14 is a block diagram illustrating an example computer system that may be used as a host 100 in some embodiments.

Referring to FIG. 1, the provider network 100 may include a network substrate 102 that includes networking devices such as routers, switches, network address translators (NATs), and so on, as well as the physical connections among the devices. In at least some embodiments, the VMMs 112, network processing devices 110, or other devices or processes on the network substrate may use encapsulation protocol technology to encapsulate and route network packets over the network substrate 102 between resource instances 114 on different hosts 100 within the provider network 100, or to endpoints external to the provider network 100 (e.g., user devices 170) via network devices on the substrate 102 such as edge routers. The encapsulation protocol technology may be used on the network substrate 102 to route encapsulated packets (also referred to as network substrate packets or provider network packets) between endpoints on the network substrate 102 via overlay network paths or routes. The encapsulation protocol technology may be viewed as providing a virtual network topology overlaid on the network substrate. In at least some embodiments, the encapsulation protocol technology may include a mapping service that maintains a mapping directory that maps IP overlay addresses (public IP addresses of the provider network) to substrate IP addresses (private IP addresses) and that may be accessed by various processes on the provider network 100 for routing packets between endpoints on the network substrate 102. For further information about a virtual network technology that uses an encapsulation protocol to implement an overlay network on a network substrate, see FIGS. 9 through 13.

Figure 12:
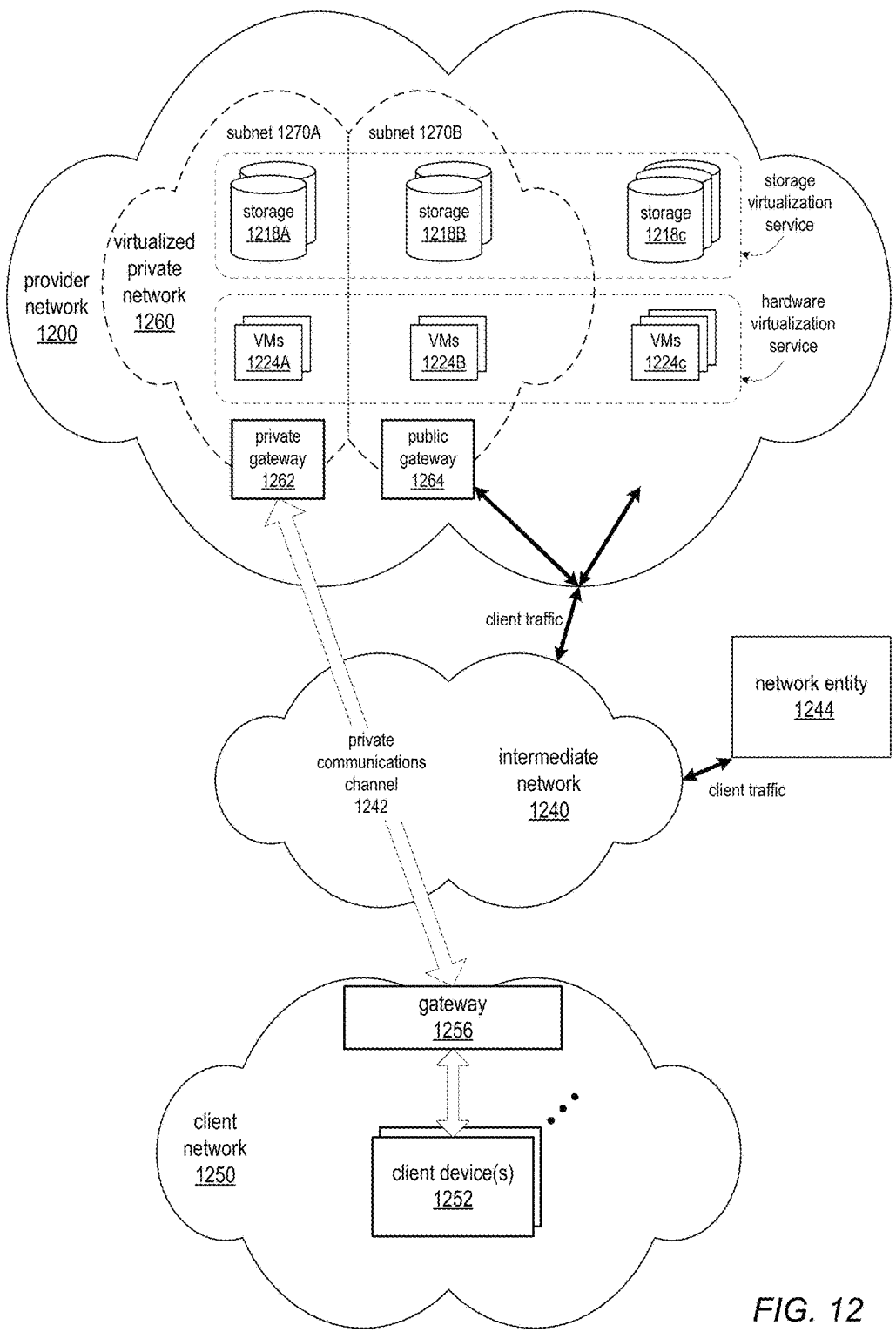
FIG. 12 illustrates an example provider network that provides virtualized private networks to at least some clients, according to at least some embodiments.
Figure 13:
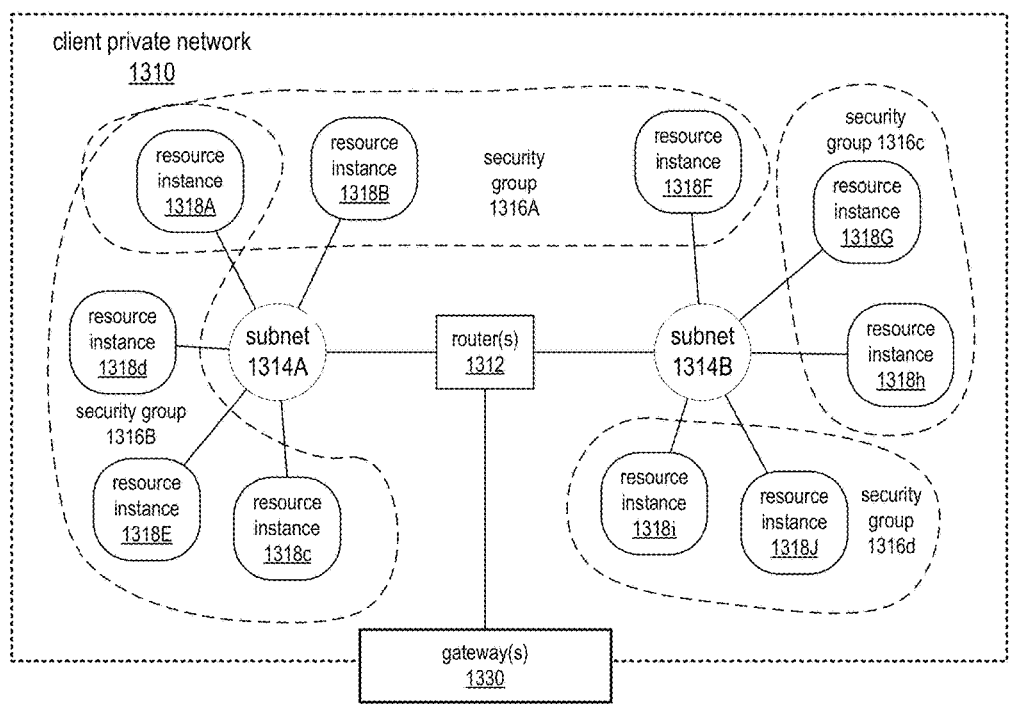
FIG. 13 illustrates subnets and security groups in an example virtual private network implementation on a provider network, according to at least some embodiments.

As illustrated in FIGS. 12 and 13, in some embodiments of a provider network 100, a client (e.g., an application provider) may establish a private network with an address space on the provider network 100. A resource instance 114 may be assigned an address within the private network's address space. Packets sent from the resource instance 114 may be encapsulated by the VMM 112 on the host system 110, or by a network processing device on the host system, and routed to their destinations via the provider network 100. Packets sent to the resource instance 114 may be decapsulated by VMM 112 on the host system 110, or by a network processing device on the host system, and provided to the resource instance 114.

Referring to FIG. 1, a service provider that provides a provider network 100 for clients (e.g., application provider(s) 160) may establish and implement rating and usage models that may be used to associate clients' provider network IP addresses with IP address ranges of autonomous networks 150 such as mobile service provider networks. Clients of the service provider (e.g., application provider(s) 160), via external device(s) (e.g., a management console 872 as illustrated in FIG. 8) coupled to the provider network 100 via an intermediate network such as the Internet 190, may access one or more services 106 of the provider network 100 via API(s) 108 to the services 106 to perform application configuration and management 162 tasks for the clients' applications on the provider network 100, for example to obtain and configure provider network resource instances 114 for their applications, and to select rating and/or usage models for their applications. The rating and usage models may be applied when monitoring and rating traffic 172 between the clients' applications on the provider network resource instances 114 and the clients' customers' user devices 172 that access the clients' applications through the autonomous networks 150 associated with the models. Rating models may be applied by the provider network 100 to the clients' usage on the provider network 100 resulting from the clients' customers' accesses of the clients' applications on resource instances 114 to the provider network 100. Usage models may be applied by the autonomous networks 150 to the clients' customers' usage on autonomous networks 150 when accessing the clients' applications on the resource instances 114 in the provider network 100. A rating or usage model may be applied only to traffic from the clients' resource instances 114 to the customers' devices 170, only to traffic to the clients' resource instances 114 from the customers' devices 170, or to traffic in both directions.

Rating Model

Referring to FIG. 1, in some embodiments, a rating model may be established by the service provider for a particular autonomous network 150 such as autonomous network 150B, and may be provided to or selected by an application provider 160 for use with the application provider's resource instance 114 that implements the application provider's application on the provider network 100. The rating model may be associated with the IP address range of the autonomous network 150B. In some embodiments, the provider network 100 may obtain the IP address range of the autonomous network 150B for the rating model from the autonomous network 150B, for example via an API 108 to a service 106. The service 106 may store the IP address range of the autonomous network 150B, for example as or in IP address range information 130. The application provider 160 may select the rating model to associate the rating model with their resource instance 114. In some embodiments, a subset of provider network IP addresses may be pre-allocated for and associated with the rating model, and the provider network IP address may be assigned to the application provider's resource instance 114 from the pre-allocated subset. Alternatively, a provider network IP address may be assigned to the application provider's resource instance 114, and the assigned provider network IP address may be associated with the rating model.

Once associated with the provider network IP address of the application provider's resource instance 114, the rating model may be applied by components of the provider network (e.g., a provider network rating service 120) when monitoring and rating user traffic 172D on the provider network 100 between IP addresses within the IP address range of the autonomous network 150B (e.g., autonomous network 150B addresses used by user device(s) 170B when accessing the application provider's resource instance 114) and the provider network IP address of the application provider's resource instance 114.

In some embodiments, provider network (PN) IP address usage data 116 for user traffic 172D on the provider network may be collected, for example by VMMs 112 on host devices 110 that implement the resource instances 114, and provided to a provider network rating service 120 implemented on one or more computing devices on the provider network 100. The rating service 120 may map the collected usage data 116 to IP address ranges obtained from IP address range information 130 including the IP address range of autonomous network 150B of the rating model associated with the application provider's resource instance 114. The rating service 120 may then perform usage classification on the mapped usage data 116. In some embodiments, usage classification may determine rating models according to the mapping information and apply the rating models to provider network usage for the resource instances 114 including the application provider's resource instance 114. The classified usage data 116 may then be aggregated according to clients of the provider network and/or the clients' resource instances 114. Provider network usage reports may then be generated according to the aggregated data 116.

For example, a provider network usage report may be generated by the provider network rating service 120 for an application provider 160 that indicates provider network usage of the application provider's resource instance 114 generated by access of the resource instance 114 by user devices 170B via autonomous network 150B under the rating model associated with the application provider's resource instance 114. The provider network usage report may also indicate other provider network usage of the application provider's resource instance 114, for example provider network usage generated by user traffic 172A and 172C to and from user devices 170A and/or 170C through other networks such as autonomous network 150A and Internet 190.

The provider network usage report may, for example, be used to provide different service levels for the application provider's resource instance 114 for the different provider network usages associated with the application provider's resource instance 114. For example, the provider network usage generated by user devices 170A and/or 170C through other networks may be billed at a standard usage rate for the provider network 100, while the provider network usage of the application provider's resource instance 114 generated by user devices 170B via autonomous network 150B under the rating model may be billed at a lower rate, may be provided at no charge, or may not be counted against an amount of provider network usage allocated to the application provider's resource instance 114.

FIG. 2 illustrates a rating model 222 applied to provider network traffic 274 to and/or from a client's resource instance 214 on a provider network 200, according to some embodiments. The rating model 222 of FIG. 2 may, for example, be implemented by a service provider in a provider network environment as illustrated in FIG. 1. In some embodiments, the rating model 222 may be established by the service provider for application to provider network traffic 274 to and/or from a particular autonomous network 250, for example a mobile service provider network. In some embodiments, the rating model 222 may be associated with the IP address range of the autonomous network 250. In some embodiments, the provider network 200 may obtain the IP address range of the autonomous network 250 for the rating model 222 from the autonomous network 250, for example via an API 108 to a service 106 as illustrated in FIG. 8. The IP address range of the autonomous network 250 may be stored on the provider network as autonomous network (AN) IP address range information 230.

The rating model 222 may be provided to or selected by a provider network client such as an application provider for use with the client's resource instance 214 on the provider network 200, for example as illustrated in FIG. 8. A provider network IP address for the rating model may be assigned to the client's resource instance. In some embodiments, a subset of provider network IP addresses may be pre-allocated for and associated with the rating model 222, and the provider network IP address may be assigned to the resource instance 214 from the pre-allocated subset. Alternatively, a provider network IP address may be assigned to the resource instance 214, and the assigned provider network IP address may be associated with the rating model 222. Once associated with the provider network IP address of the client's resource instance 214, the rating model 222 may be applied by a provider network rating service 220 when monitoring and rating user traffic 272 on the provider network 200 between IP addresses within the IP address range of the autonomous network 250 that are assigned to user devices 270 when accessing the provider network IP address assigned to the resource instance 214. FIG. 3 illustrates operations of a rating service 220.

FIG. 3 illustrates a provider network rating service 320 that rates provider network usage for clients' resource instances in a provider network environment, according to some embodiments. The rating service of FIG. 3 may, for example, be implemented by one or more computing systems in a provider network 100 as illustrated in FIGS. 1 and 2. In some embodiments, IP address usage data 316 for provider network traffic may be collected, for example by VMMs 112 on host devices 110 that implement resource instances 114 as illustrated in FIG. 1. The IP address usage data 316 may be provided to or obtained by provider network rating service 320. In some embodiments, the IP address usage data 316 may indicate the provider network addresses of resource instances and respective endpoint addresses including but not limited to the addresses of endpoints on autonomous networks. Provider network rating service 320 may also obtain IP address range information 330 for rating the provider network traffic. The IP address range information 330 may include, but is not limited to, address ranges of one or more autonomous networks for which rating models have been established. Provider network rating service 320 may also obtain other information 318 for rating the provider network traffic, including but not limited to information describing the rating models to be applied to provider network traffic to and/or from the one or more autonomous networks.

In some embodiments, the rating service 320 may map 322 the usage data 316 for provider network IP addresses to IP address ranges obtained from IP address range information 330, including the IP address ranges of autonomous networks for which rating models have been established. The rating service 320 may then perform usage classification 324 on the mapped usage data 316. In some embodiments, usage classification 324 may determine rating models for provider network traffic between autonomous networks and provider network resource instances according to the mapping information and apply the rating models to the provider network traffic of the resource instances. The classified usage data 316 may then be aggregated according to clients of the provider network and/or the clients' resource instances. Provider network usage reports 328 may then be generated according to the aggregated data 316.

For example, a provider network usage report 328 may be generated by the provider network rating service 320 for a client that indicates provider network usage of the client's provider network resource instance generated by access of the resource instance from user devices via an autonomous network under a particular rating model associated with the client's resource instance. The provider network usage report 328 may also indicate other provider network usage of the client's resource instance, for example provider network usage generated by user traffic to and from user devices through other networks such as other autonomous networks and/or the Internet, or from other endpoints on the provider network. The provider network usage report may, for example, be used to provide different service levels for the client's resource instance for the different provider network usages associated with the resource instance. For example, the provider network usage generated by user devices through other networks may be billed at a standard usage rate for the provider network, while the provider network usage of the client's resource instance generated by user devices via the autonomous network under the rating model may be billed at a lower rate, may be provided at no charge, or may not be counted against an amount of provider network usage allocated to the resource instance.

Figure 4A:
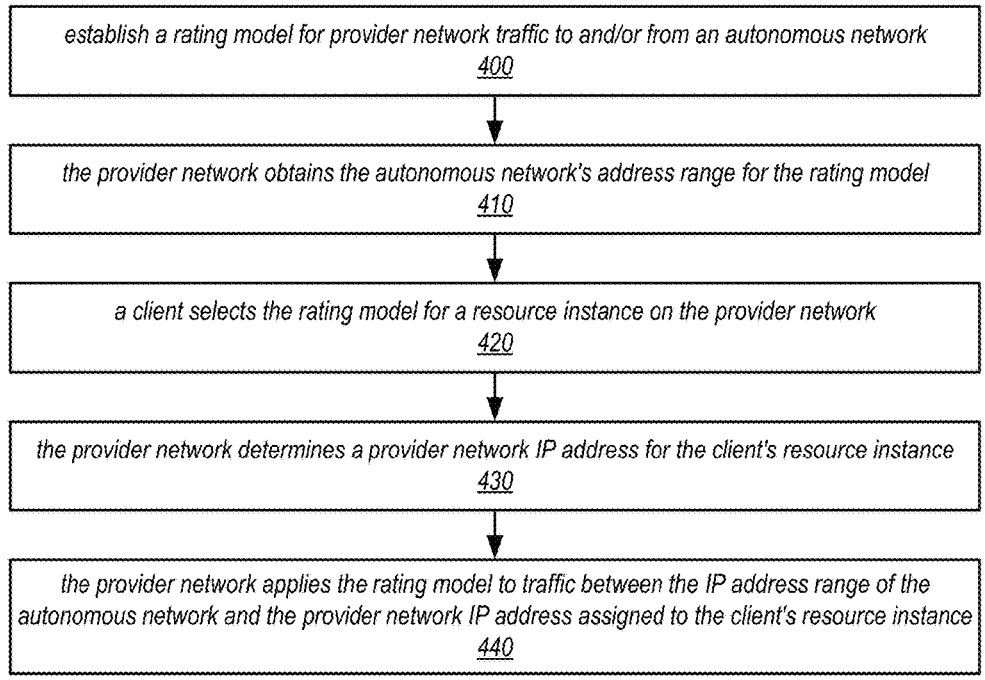
FIGS. 4A and 4B illustrate a method for applying a rating model to a client's resource instance in a provider network environment, according to some embodiments.
Figure 4B:
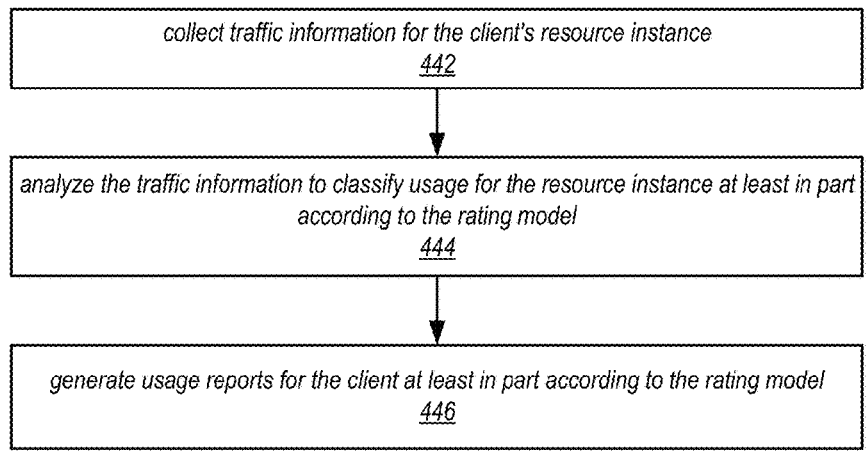

FIGS. 4A and 4B illustrate a method for applying a rating model to a client's resource instance in a provider network environment, according to some embodiments. The method of FIGS. 4A and 4B may, for example, be implemented in a provider network environment as illustrated in FIGS. 1, 2, and 3.

As illustrated at 400 of FIG. 4A, a service provider may establish a rating model for provider network traffic to and/or from an autonomous network. The rating model may, for example, be implemented by a service provider for clients of a provider network in a provider network environment, for example as illustrated in FIG. 1. In some embodiments, the rating model may be established by the service provider for application to provider network traffic to and/or from a particular autonomous network, for example a mobile service provider network.

As illustrated at 410 of FIG. 4A, the provider network obtains the autonomous network's address range for the rating model. In some embodiments, the rating model may be associated with the IP address range of the autonomous network. In some embodiments, the provider network may obtain the IP address range of the autonomous network for the rating model from the autonomous network, for example via an API to a service as illustrated in FIG. 8. The IP address range of the autonomous network may be stored on the provider network. In some embodiments, the entire IP address range of the autonomous network may be provided to the provide network and associated with the rating model. Alternatively, a subrange or subset of the autonomous network IP address range may be provided to the provide network and associated with the rating model.

As illustrated at 420 of FIG. 4A, a client selects the rating model for a resource instance on the provider network. For example, the rating model may be selected by a provider network client such as an application provider via an interface to a provider network API and service as illustrated in FIG. 8.

As illustrated at 430 of FIG. 4A, the provider network determines a provider network IP address for the client's resource instance. The provider network IP address for the rating model is assigned to the client's resource instance. In some embodiments, a subset of provider network IP addresses may be pre-allocated for and associated with the rating model, and the provider network IP address may be determined from the resource instance from the pre-allocated subset. Alternatively, a provider network IP address may be determined and assigned to the resource instance, and the assigned provider network IP address may then be associated with the rating model.

As illustrated at 440 of FIG. 4A, the provider network applies the rating model to traffic between the IP address range of the autonomous network and the provider network IP address assigned to the client's resource instance. Once associated with the provider network IP address of the client's resource instance, the rating model may be applied by a provider network rating service when monitoring and rating provider network traffic between the IP address range of the autonomous network associated with the rating model and the provider network IP address assigned to the resource instance. FIG. 4B illustrates an example method for applying a rating model for a client's resource instance that may be used at element 440.

FIG. 4B illustrates an example method for rating usage for a client's resource instance on a provider network that may, for example, be implemented by a rating service 420 as illustrated in FIG. 4. The method of FIG. 4B may be performed at element 440 of FIG. 4A.

As illustrated at 442 of FIG. 4B, IP traffic information may be collected for the client's resource instance. In some embodiments, IP traffic information (e.g., IP address usage data) for provider network traffic may be collected, for example by VMMs on host devices that implement the resource instances as illustrated in FIG. 1; the collected IP traffic information may be provided to or obtained by provider network rating service. In some embodiments, the IP traffic information may indicate the provider network addresses of resource instances and respective endpoint addresses including but not limited to the addresses of endpoints on autonomous networks. The rating service may also obtain IP address range information for rating the provider network traffic, including but not limited to address ranges of one or more autonomous networks for which rating models have been established.

As illustrated at 444 of FIG. 4B, the traffic information may be analyzed to classify usage for the resource instance at least in part according to the client's selected rating model. In some embodiments, the rating service may map IP address usage data for provider network IP addresses to IP address ranges indicated by the IP address range information, including the IP address ranges of autonomous networks for which rating models have been established. The rating service may then perform usage classification on the mapped usage data. In some embodiments, the usage classification may determine rating models for provider network traffic between autonomous networks and provider network resource instances according to the mapping information and apply the rating models to the provider network traffic of the resource instances. The classified usage data may then be aggregated according to clients of the provider network and/or the clients' resource instances.

As illustrated at 446 of FIG. 4B, provider network usage reports may be generated for the client at least in part according to the client's selected rating model. For example, a provider network usage report may be generated by the provider network rating service for the client that indicates provider network usage of the client's provider network resource instance generated by access of the resource instance from user devices via the autonomous network associated with the rating model that was selected by the client. The provider network usage report may also indicate other provider network usage of the client's resource instance, for example provider network usage generated by user traffic to and from IP addresses on other networks such as other autonomous networks or the Internet, or provider network usage generated by user traffic to and from other IP addresses on the provider network. The provider network usage report may, for example, be used to provide different service levels for the client's resource instance for the different provider network usages associated with the resource instance. For example, the provider network usage generated by user devices via the autonomous network under the rating model may be billed at a lower rate than the standard provider network billing rate, or may be provided at no charge.

Usage Models

Referring to FIG. 1, in some embodiments, a usage model may be established by the service provider with a particular autonomous network 150 such as autonomous network 150A, and may be provided to or selected by an application provider 160 for use with the application provider's resource instance 114 that implements the application provider's application on the provider network 100. The negotiated usage model may specify a particular service level for the autonomous network 150A's customers for user traffic 172A on the autonomous network 150A between IP addresses of the autonomous network 150A used by autonomous network 150A's customers and provider network IP address(es) provided to the autonomous network 150A by the provider network 100. For example, an autonomous network 150A customer's usage when accessing a provider network IP address under the usage model may be billed at a lower rate than the standard usage rate, may be provided at no charge, or the usage may not be counted against the customer's allocated usage amount according to the customer's usage-based plan with the autonomous network 150A.

In some embodiments, once established, the usage model may be associated with IP addresses or address range(s) of the provider network 100. The IP addresses or address range(s) of the provider network 100 that are associated with the usage model may be provided to the autonomous network 150A, for example via communications 156 between an autonomous network (AN) service system 152A and a provider network service 106 according to an API 108 of the service 106, and may be stored on the autonomous network 150A as PN IP address range(s) 154. In some embodiments, the provider network service 106 may store the provider network IP addresses or address range(s) associated with the usage model, for example as or in IP address range information 130.

A provider network IP address associated with the usage model may be assigned to the application provider's resource instance 114. In some embodiments, a subset of provider network IP addresses may be pre-allocated for the usage model and provided to the autonomous network 150A, and the provider network IP address may be assigned to the application provider's resource instance 114 from the pre-allocated subset. Alternatively, a provider network IP address may be assigned to the application provider's resource instance 114, and the assigned provider network IP address may then be associated with the usage model and provided to the autonomous network 150A.

Once the usage model is selected by the application provider 160 for use with their resource instance 114 and a provider network IP address for the usage model is assigned to the resource instance 114 and recorded with the autonomous network 150A, the usage model may be applied by components of the autonomous network 150A such as autonomous network (AN) service system 152A when monitoring and rating user traffic 172A on the autonomous network 150A between the application provider's customers' user devices 170A at IP addresses of the autonomous network 150A and the provider network IP address assigned to the application provider's resource instance 114. For example, a customer's user traffic 172A on the autonomous network 150A to and/or from the provider network IP address assigned to the application provider's resource instance 114 may be billed at a lower rate than the standard usage rate, may be provided at no charge, or the usage may not be counted against the customer's allocated usage amount according to the customer's usage-based plan with the autonomous network 150A.

Figure 5:
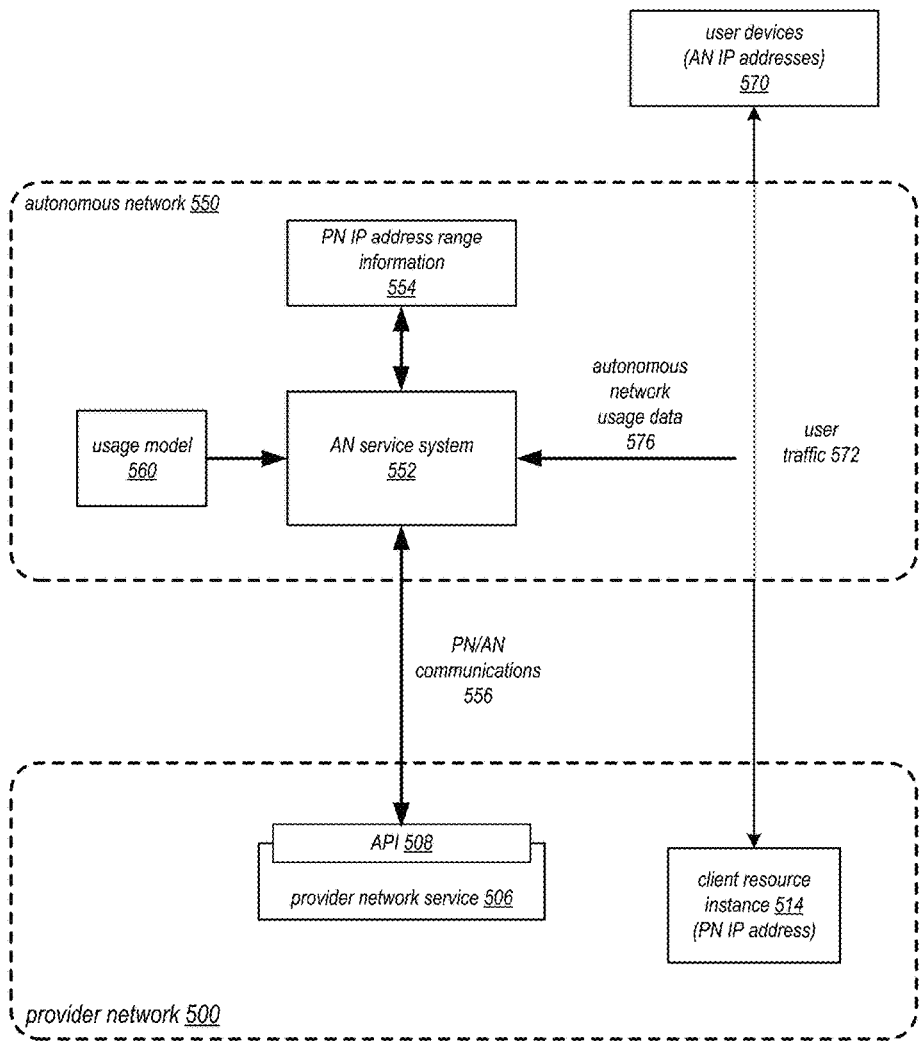
FIG. 5 illustrates a usage model applied to a client's resource instance in a provider network environment, according to some embodiments.

FIG. 5 illustrates a usage model 560 applied by an autonomous network 550 for traffic to and/or from a client's resource instance 514 in a provider network 500, according to some embodiments. The usage model of FIG. 5 may, for example, be implemented by a service provider in a provider network environment as illustrated in FIG. 1. In some embodiments, a usage model 560 may be established for a particular autonomous network 550, for example by negotiations between a service provider that provides the provider network 500 and the autonomous network 550 provider. In some embodiments, the usage model 560 may specify a particular service level for the autonomous network 550's customers for user traffic 572 on the autonomous network 550 between IP addresses of the autonomous network 550 and provider network IP addresses or address ranges associated with the usage model 560. For example, an autonomous network 550 customer's usage when accessing a provider network IP address under the usage model 560 may be billed at a lower rate than the standard usage rate of the autonomous network 560, may be provided at no charge to the customer, or the usage may not be counted against the customer's allocated usage amount according to a usage-based plan with the autonomous network 550.

In some embodiments, the usage model 560 may be associated with IP addresses or address ranges of the provider network 500. The IP addresses or address ranges of the provider network 500 that are associated with the usage model 560 may be provided to the autonomous network 550. In some embodiments, information for the usage model 560, for example provider network addresses or address ranges associated with the usage model 560, may be provided to the autonomous network 550 via communications 556 between a provider network service 506 implemented by one or more computing devices of the provider network 500 and an autonomous network (AN) service system 552 implemented by one or more computing devices of the autonomous network 550. In some embodiments, the communications 556 may be performed according to an API 508 to the service 506. The provider network addresses or address ranges associated with the usage model 560 may be stored by the AN service system 552 of the autonomous network 550, for example as PN IP address range information 554.

The usage model 560 may be provided to or selected by a provider network client such as an application provider for use with the client's resource instance 514 on the provider network 500, for example as illustrated in FIG. 8. A provider network IP address associated with the usage model 560 may be assigned to the client's resource instance 514. In some embodiments, a subset of provider network IP addresses may be pre-allocated for the usage model 560 and provided to the autonomous network 550, and the provider network IP address may be assigned to the client's resource instance 514 from the pre-allocated subset. Alternatively, a provider network IP address may be assigned to the client's resource instance 514, for example during initialization and configuration of the resource instance, and the assigned provider network IP address may then be associated with the usage model 560 and provided to the autonomous network 550.

Once the usage model 560 is selected by the client for use with their resource instance 514 and a provider network IP address for the usage model 560 is assigned to the resource instance 514 and recorded with the autonomous network 550, the usage model 560 may be applied by AN service system 552 when monitoring and rating user traffic 572 on the autonomous network 550 between user devices 570 at IP addresses of the autonomous network 550 and the provider network IP address assigned to the client's resource instance 514. Autonomous network usage data 576 for user traffic 572 including but not limited to the traffic between the user devices 570 and the resource instance 514 may be collected by the AN service system 552. The autonomous network usage data 576 may be analyzed by the AN service system 552 to determine traffic 572 between specific user devices 570 and the resource instance 514 at least in part according to the PN IP address range information 554 for the usage model 560, and the usage model 560 may then be applied to the determined traffic 572 to provide the service level of the usage model 560 to respective customers associated with the user devices 570. For example, a customer's usage of the autonomous network 550 for traffic to and/or from the provider network IP address assigned to the resource instance 514 may be billed at a lower rate than the standard usage rate of the autonomous network 550, may be provided at no charge, or the usage may not be counted against the customer's allocated usage amount according to the customer's usage-based plan with the autonomous network 550. The customer's usage of the autonomous network 550 for other traffic to addresses not associated with the usage plan 560 may, for example, be billed at the standard usage rate, or counted against the customer's allocated usage amount.

Figure 6A:
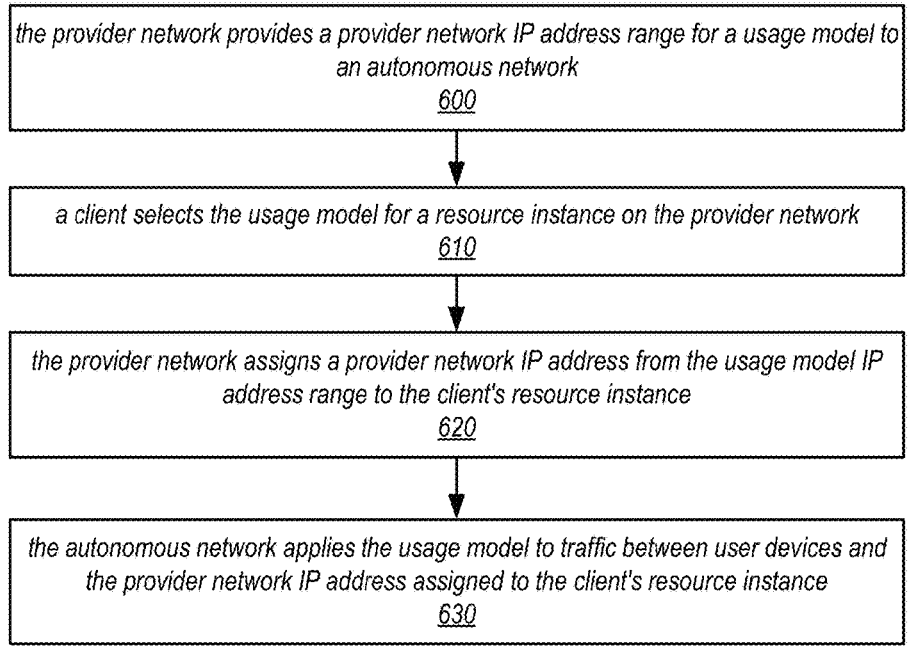
FIG. 6A illustrates a method for applying a usage model to a client's resource instance in a provider network environment, according to some embodiments.

FIG. 6A illustrates a method for applying a usage model to a client's resource instance in a provider network environment, according to some embodiments. The method of FIG. 6A may, for example, be implemented in a provider network environment as illustrated in FIGS. 1 and 5. A usage model may, for example, be implemented by a service provider in a provider network environment as illustrated in FIG. 1. In some embodiments, the usage model may be established for a particular autonomous network, for example by negotiations between the service provider and the autonomous network provider. In some embodiments, the usage model may specify a particular service level for the autonomous network's customers for user traffic on the autonomous network between IP addresses of the autonomous network and provider network IP addresses or address ranges associated with the usage model. For example, an autonomous network customer's usage when accessing a provider network IP address under the usage model may be billed at a lower rate than the standard usage rate of the autonomous network, may be provided at no charge to the customer, or the usage may not be counted against the customer's allocated usage amount according to a usage-based plan with the autonomous network.

As illustrated at 600 of FIG. 6A, a provider network of a service provider may specify a provider network IP address range for a usage model to an autonomous network. In some embodiments, the provider network may provide an indication of the provider network IP address range for the usage model to the autonomous network via an API of the provider network to inform the autonomous network that the usage model is to be applied for addresses within the specified range.

As illustrated at 610 of FIG. 6A, a client selects the usage model for a resource instance on the provider network. For example, the usage model may be selected by a provider network client such as an application provider for use with the client's resource instance on the provider network as illustrated in FIG. 8.

As illustrated at 620 of FIG. 6A, the provider network assigns a provider network IP address from the range to the client's resource instance. In some embodiments, a subset of provider network IP addresses may be pre-allocated for the usage model and provided to the autonomous network, and a provider network IP address from the pre-allocated subset may be assigned to the client's resource instance from the pre-allocated subset.

As illustrated at 630 of FIG. 6A, the autonomous network applies the usage model to traffic between autonomous network IP addresses assigned to user devices and the provider network IP address assigned to the client's resource instance. The usage model may be applied by components of the autonomous network when monitoring and rating user traffic on the autonomous network between user devices at IP addresses of the autonomous network and the provider network IP address assigned to the client's resource instance. For example, a customer's traffic on the autonomous network to and/or from the provider network IP address assigned to the client's resource instance may be billed at a lower rate than the standard usage rate, may be provided at no charge, or the usage may not be counted against the customer's allocated usage amount according to the customer's usage-based plan with the autonomous network.

Figure 6B:
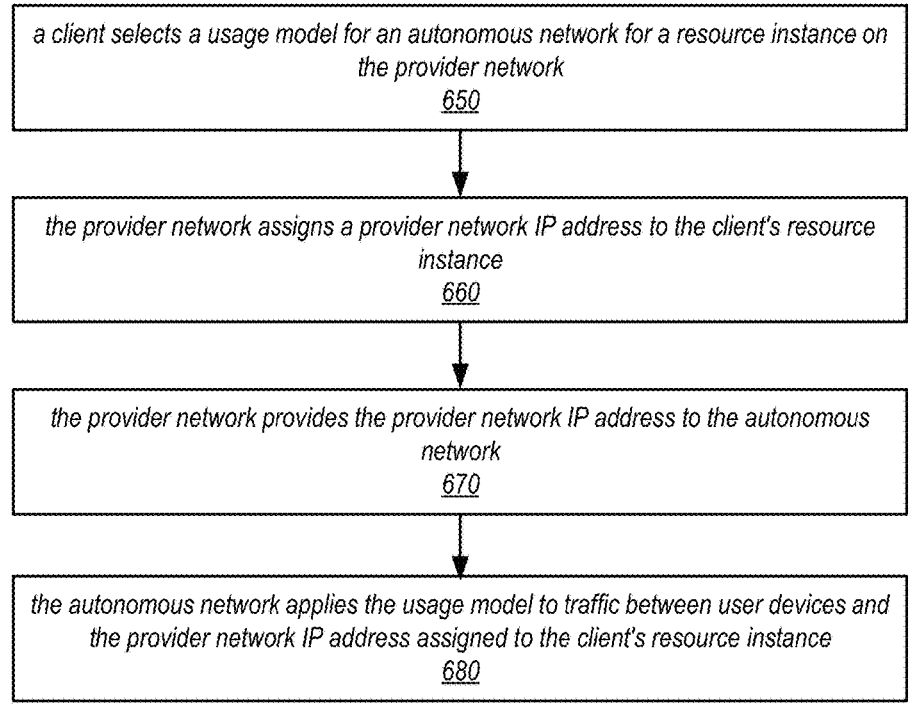
FIG. 6B illustrates an alternative method for applying a usage model to a client's resource instance in a provider network environment, according to some embodiments.

FIG. 6B illustrates an alternative method for applying a usage model to a client's resource instance in a provider network environment, according to some embodiments. In some embodiments, instead of pre-allocating provider network addresses for a usage model, providing the provider network addresses to the autonomous network, and then assigning the pre-allocated addresses to clients' resource instances when the usage model is selected, a provider network address may be otherwise selected or determined and assigned to the client's resource instance. The assigned address may then be associated with the usage model and provided to the autonomous network to inform the autonomous network that the address is associated with the usage model.

As illustrated at 650 of FIG. 6B, a client selects a usage model for an autonomous network for a resource instance on the provider network. For example, the usage model may be selected by a provider network client such as an application provider for use with the client's resource instance on the provider network as illustrated in FIG. 8.

As illustrated at 660 of FIG. 6B, the provider network assigns a provider network IP address to the client's resource instance. A provider network IP address may be selected or determined by the provider network, for example by a provider network service as illustrated in FIG. 8, and assigned to the client's resource instance, for example during initialization and configuration of the resource instance as illustrated in FIG. 8. The assigned address may be associated with the usage model selected for the client's resource instance 514, for example during initialization and configuration of the resource instance and usage model as illustrated in FIG. 8.

As illustrated at 670 of FIG. 6B, the provider network may provide the provider network IP address to the autonomous network. In some embodiments, the provider network may provide an indication of the provider network IP address assigned to the client's resource instance to the autonomous network via an API of the provider network to inform the autonomous network that the usage model is to be applied to autonomous network traffic to and from the specified provider network IP address.

As illustrated at 680 of FIG. 6B, the autonomous network applies the usage model to traffic between autonomous network IP addresses assigned to user devices and the provider network IP address assigned to the client's resource instance. The usage model may be applied by components of the autonomous network when monitoring and rating user traffic on the autonomous network between user devices at IP addresses of the autonomous network and the provider network IP address assigned to the client's resource instance. For example, a customer's traffic on the autonomous network to and/or from the provider network IP address assigned to the client's resource instance may be billed at a lower rate than the standard usage rate, may be provided at no charge, or the usage may not be counted against the customer's allocated usage amount according to the customer's usage-based plan with the autonomous network.

Figure 7:
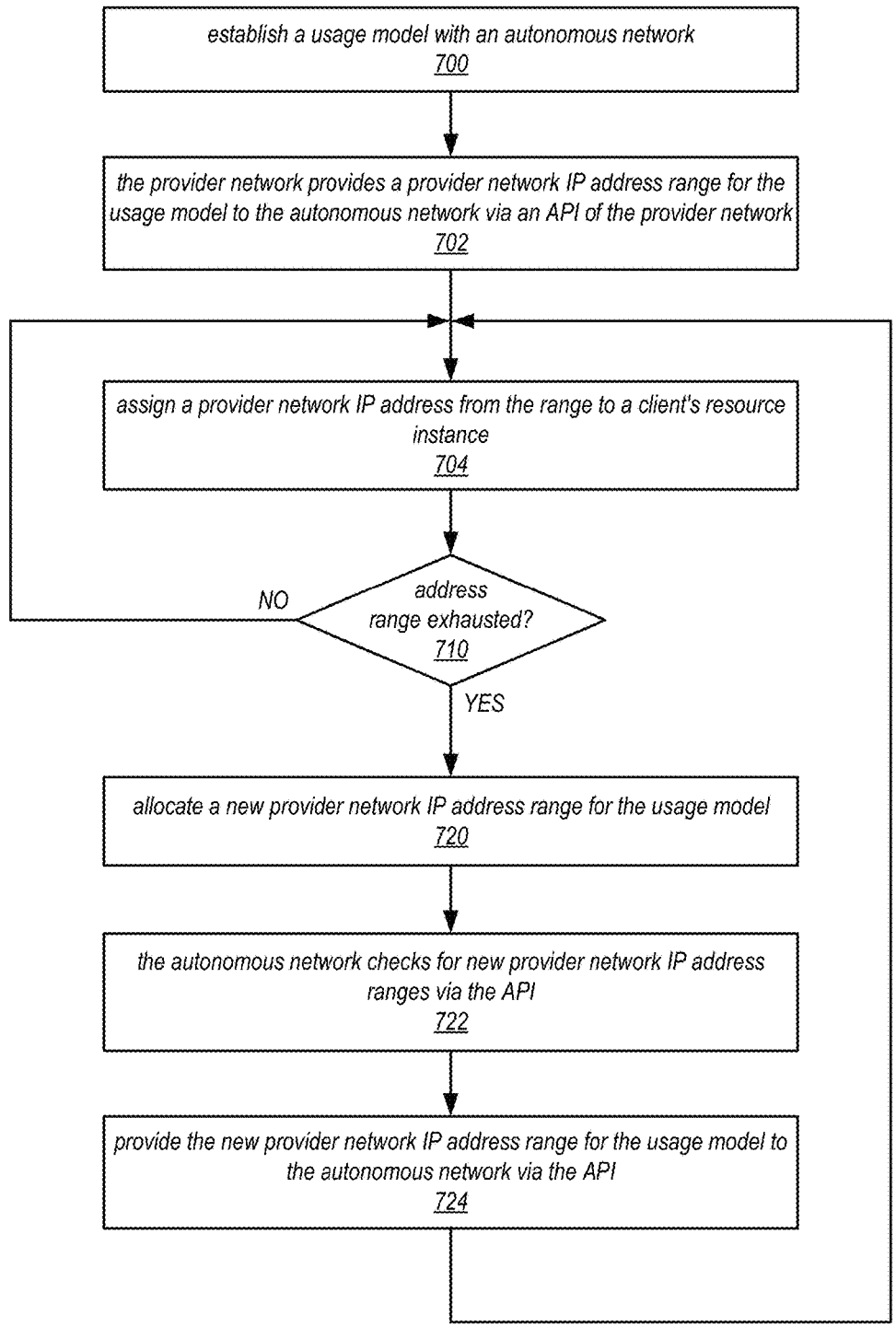
FIG. 7 illustrates a method for establishing and maintaining a usage model between a provider network and an autonomous network in a provider network environment, according to some embodiments.

FIG. 7 illustrates a method for establishing and maintaining a usage model between a provider network and an autonomous network in a provider network environment, according to some embodiments. The method of FIG. 7 may, for example, be implemented in a provider network environment as illustrated in FIGS. 1 and 5.

As illustrated at 700 of FIG. 7, a service provider may establish a usage model with an autonomous network for its provider network. A usage model may, for example, be implemented by a service provider in a provider network environment as illustrated in FIG. 1. In some embodiments, the usage model may be established for a particular autonomous network, for example by negotiations between the service provider and the autonomous network provider. In some embodiments, the usage model may specify a particular service level for the autonomous network's customers for user traffic on the autonomous network between IP addresses of the autonomous network and provider network IP addresses within address ranges associated with the usage model.

As illustrated at 702 of FIG. 7, the provider network may provide an indication of an initial provider network IP address range for the usage model to the autonomous network via an API of the provider network, for example as illustrated in FIG. 1. The provider network may also inform the autonomous network that the usage model is to be applied for addresses within the indicated provider network IP address range.

As illustrated at 704 of FIG. 7, the provider network may assign a provider network IP address from the range to a client's resource instances. For example, the client may select the usage model for their resource instance on the provider network during configuration and initialization of the resource instance as illustrated in FIG. 8. A service of the provider network may select an available provider network IP address from the range of addresses associated with the usage model and assign the selected provider network IP address to the client's resource instance.

At 710 of FIG. 7, if the address range is exhausted, then the method may proceed to element 720. Otherwise, the method may return to element 704 to continue assigning addresses from the address range to clients' resource instances. For example, in some embodiments, the provider network may check a threshold for available addresses for the usage model and, if the number of available addresses in the address range is at or below the threshold, then the method may proceed to element 720. The threshold may be set to 0 in some embodiments, or may be greater than 0 in some embodiments.

As illustrated at 720 of FIG. 7, the provider network may allocate a new provider network IP address range for the usage model. As illustrated at 722 of FIG. 7, the autonomous network checks for new provider network IP address ranges via the API. In some embodiments, a process on the autonomous network may periodically or aperiodically poll or query the provider network via an API of the provider network to determine if there are any new provider network IP addresses for the usage model. As illustrated at 724 of FIG. 7, the provider network may provide an indication of the new provider network IP address range for the usage model to the autonomous network via the API of the provider network in response to the query from the autonomous network.

In some embodiments, as an alternative to elements 722 and 724 of FIG. 7, the provider network may push the new provider network IP address range for the usage model to the autonomous network, for example via an API provided by a process or service on the autonomous network.

In some embodiments, instead of or in addition to providing indications of provider network address ranges for usage models to the autonomous network via an API of the provider network, the provider network may instead provide the provider network address ranges for usage models via other methods. For example, the provider network may publish the provider network address ranges for usage models to files (e.g., JavaScript Object Notation. (JSON) files) that are provided to or made accessible to respective autonomous networks. For example, a file including provider network address ranges for a usage model may be stored to a secure location on the provider network, and may be read from the secure location by the autonomous network. As another example, a file including provider network address ranges for a usage model may be sent to a process on the autonomous network via an intermediate network such as the Internet, or via a secure channel such as a virtual private network (VPN) connection.

FIG. 8 illustrates provider network services and application programming interfaces (APIs) that may be used to select configure rating and usage models for a client's resource instances in a provider network environment, according to at least some embodiments. In some embodiments, a service provider may provide one or more provider network services 106 and one or more APIs 108 to the services 106 that allow clients (e.g., an application provider 160 as shown in FIG. 1 using a management console 872 on a client network 870) to provision, configure, manage, and view resource instances 114 on the provider network 100. In some embodiments, the APIs 108 and services 106 may allow the client to select or specify rating and/or usage models as described herein for one or more of their resource instances 114 on the provider network 100. In some embodiments, the service provider that provides the provider network 100 may charge clients for resource usage (e.g., computation and storage resource usage), bandwidth usage, and other types of network usage on the provider network 100. In some embodiments, the service provider that provides the provider network 100 may also charge clients for rating and/or usage models that are applied to the client's resource instance(s) 114.

A client associated with client network 870 may, for example, establish, provision, and manage a provider network implementation that includes one or more resource instances 114 on provider network 100 via one or more services 106 of the provider network 100 accessed through a management console 872 on client network 870. In at least some embodiments, the API(s) 108 may display an interface 874 on console 872 that provides one or more graphical and/or textual interface elements that allow the client to view, provision, and manage the client's implementation on the provider network 100. FIG. 8 shows a non-limiting example of a graphical and/or textual interface 874 that may be displayed on a client's console 872. The interface 874 may, for example, show a graphical and/or textual representation of the topology of the client's provider network implementation, for example a private network implementation as illustrated in FIGS. 12 and 13. Graphical and/or textual representations of one or more resources 114 and other components in the client's provider network implementation may be displayed. Graphical and/or textual representations of network elements, security and access control components or elements, and other components of the client's provider network implementation may also be displayed. Graphical and/or textual representations of rating and/or usage models associated with the client's resources 114 may also be displayed.

In some embodiments, the interface 874 may include one or more user interface elements 866 via which the client may provision, configure, specify or select resource instances 114, and one or more user interface elements 878 via which the client may specify or select rating and usage models for the resource instances 114. For example, in some embodiments, when provisioning or modifying a resource instance 114, the client may be allowed to specify rating and usage models for the resource instance 114. For example, the service provider may establish rating and/or usage models with one or more autonomous networks 150, and then offer the rating and/or usage models to clients through the APIs 108.

As shown in FIG. 8, the services 806 may store rating and usage model information 830 on the provider network 100, for example provider network 100 address ranges and autonomous network 150 address ranges associated with the models, and provider network IP addresses from the provider network 100 address ranges that are assigned to resource instances 114 for which clients have selected or specified rating and/or usage models. Rating model information may be provided to a provider network rating service 120 for use in applying rating model(s) to provider network traffic to and/or from the resource instances 114. Usage model information (e.g., provider network 100 address ranges associated with the usage models) may be provided to the autonomous network(s) 150 associated with the usage models, for example via an API 108.

In some embodiments, instead of or in addition to providing an interface 874 via console 872, a provider network 100 may provide a command line interface (CLI) to the provider network services 106 via which the client may provision resource instances 114 and select or specify rating and/or usage models for their resource instances 114. For example, in some embodiments, the client may provision resource instances 114 on the provider network 100 via CLI commands, and may select and/or specify rating or usage models for their resources 114 via CLI commands.

Packet Tagging

Embodiments of rating and usage models are generally described in which IP addresses and address ranges of the provider network and/or autonomous network are used in monitoring and metering usage data on the provider network (for rating models) and the autonomous networks (for usage models). In some embodiments, instead of or in addition to using IP addresses and address ranges, packets between an autonomous network and the provider network may be tagged (e.g., using one or more bits in packet headers) to indicate that the packets are being sent under a usage model and/or a rating model. For example, in some embodiments, for a usage model, instead of providing the autonomous network with provider network addresses or address ranges that are used in monitoring and rating customer traffic for a usage model, the provider network may provide an indication of a particular tag to be used for packets in the usage model. Packets from the autonomous network's IP addresses to resource instances on the provider network associated with the usage model may then be tagged with the usage model tag. Similarly, packets to the autonomous network's IP addresses from resource instances on the provider network associated with the usage model may be tagged with the usage model tag. When analyzing traffic on the autonomous network, the AN service system may check the packets to see if they are tagged, and use that information in determining customer usage information under the usage model. As another example, in some embodiments, for a rating model, instead of using the autonomous network address range to determine provider network traffic under the rating model, the provider network may provide an indication of a particular tag to be used for packets in the rating model. Packets from the autonomous network's customers to resource instances on the provider network associated with the rating model may then be tagged with the rating model tag. Similarly, packets to the autonomous network's IP addresses from resource instances on the provider network associated with the rating model may be tagged with the usage model tag. When analyzing traffic on the provider network, the provider network rating service may check the packets to see if they are tagged, and use that information in determining client usage information under the rating model.

Example Provider Network Environments

This section describes example provider network environments in which embodiments of the methods and apparatus for providing rating and usage models for IP traffic to and/or from clients' resource instances in a provider network environment as described in reference to FIGS. 1 through 8 may be implemented. However, these example provider network environments are not intended to be limiting.

Figure 9:
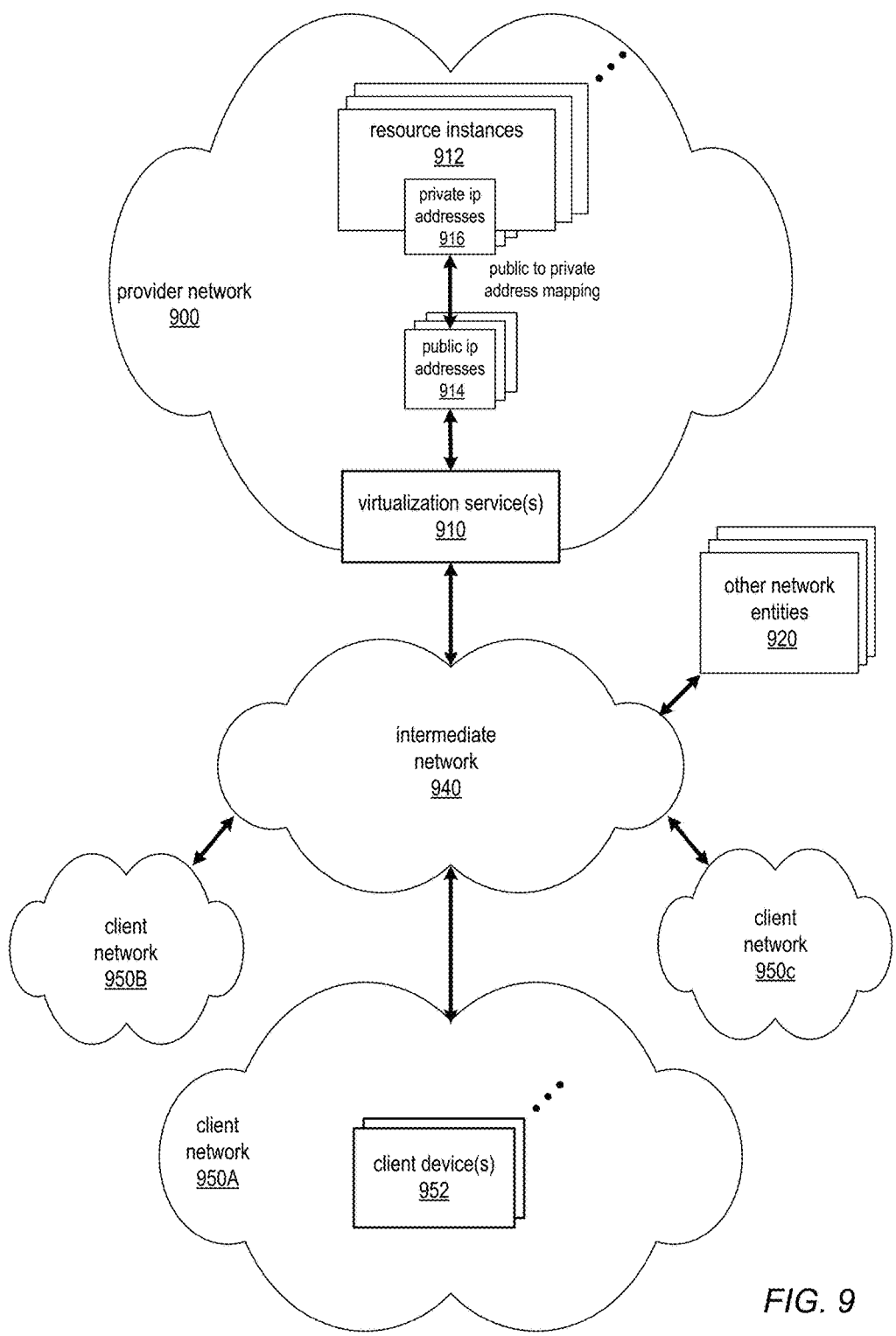
FIG. 9 illustrates an example provider network environment, according to at least some embodiments.

FIG. 9 illustrates an example provider network environment, according to at least some embodiments. A provider network 900 may provide resource virtualization to clients via one or more virtualization services 910 that allow clients to purchase, rent, or otherwise obtain instances 912 of virtualized resources, including but not limited to computation and storage resources, implemented on devices within the provider network or networks in one or more data centers. Private IP addresses 916 may be associated with the resource instances 912; the private IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that clients may obtain from the provider 900.

Conventionally, the provider network 900, via the virtualization services 910, may allow a client of the service provider (e.g., a client that operates client network 950A) to dynamically associate at least some public IP addresses 914 assigned or allocated to the client with particular resource instances 912 assigned to the client. The provider network 900 may also allow the client to remap a public IP address 914, previously mapped to one virtualized computing resource instance 912 allocated to the client, to another virtualized computing resource instance 912 that is also allocated to the client. Using the virtualized computing resource instances 912 and public IP addresses 914 provided by the service provider, a client of the service provider such as the operator of client network 950A may, for example, implement client-specific applications and present the client's applications on an intermediate network 940, such as the Internet. Other network entities 920 on the intermediate network 940 may then generate traffic to a destination public IP address 914 published by the client network 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 10:
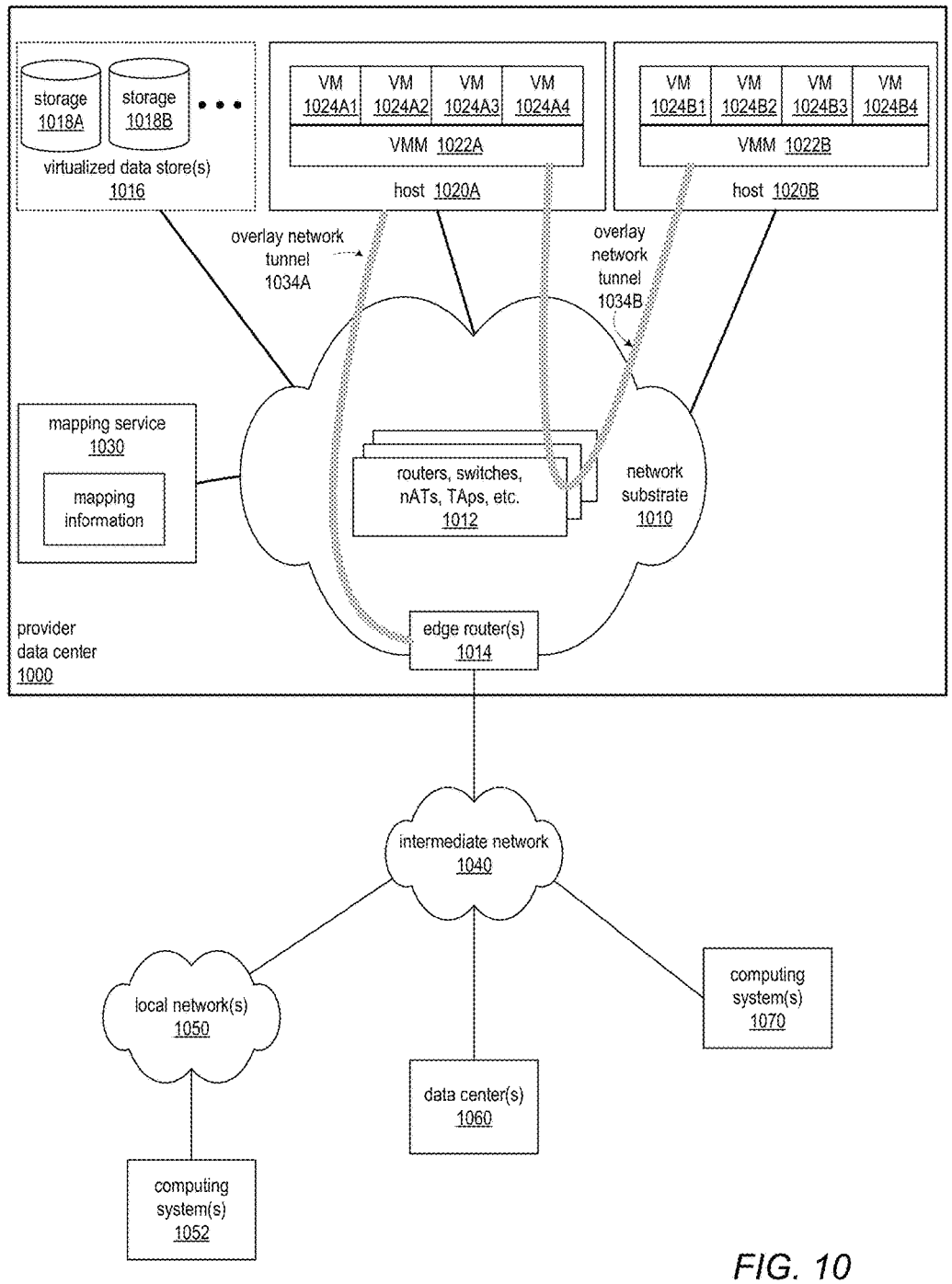
FIG. 10 illustrates an example data center that implements an overlay network on a network substrate using IP tunneling technology, according to some embodiments.

FIG. 10 illustrates an example data center that implements an overlay network on a network substrate using IP tunneling technology, according to at least some embodiments. A provider data center 1000 may include a network substrate that includes networking devices 1012 such as routers, switches, network address translators (NATs), and so on. At least some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 10) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1030) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 10, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 10, at least some networks in which embodiments may be implemented may include hardware virtualization technology that enables multiple operating systems to run concurrently on a host computer (e.g., hosts 1020A and 1020B of FIG. 10), i.e. as virtual machines (VMs) 1024 on the hosts 1020. The VMs 1024 may, for example, be rented or leased to clients of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 10 shows an example provider data center 1000 implementing a network that provides resource virtualization technology and that provides full Internet access via edge router(s) 1014 that connect to Internet transit providers, according to at least some embodiments. The provider data center 1000 may, for example, provide clients the ability to implement virtual computing systems (VMs 1024) via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1018, as virtualized resources to clients of a network provider in a similar manner.

Figure 11:
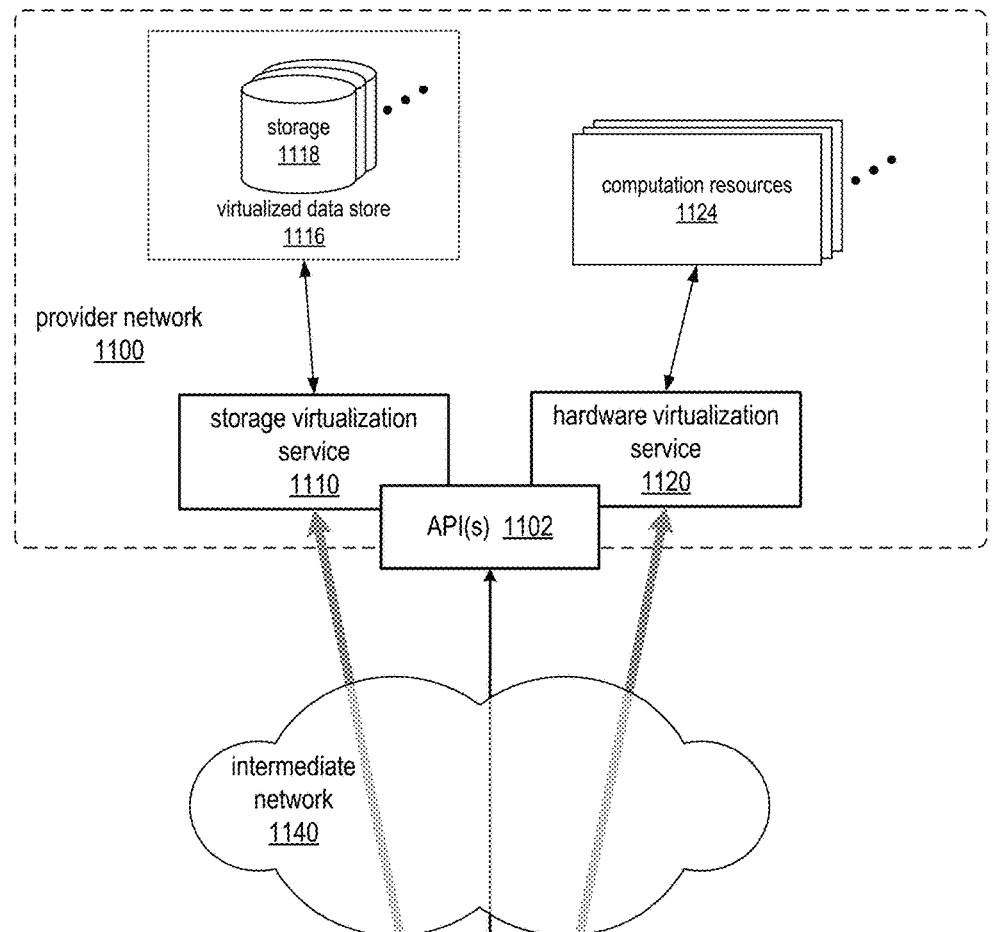
FIG. 11 is a block diagram of an example provider network that provides a storage virtualization service and a hardware virtualization service to clients, according to at least some embodiments.
Figure 11:
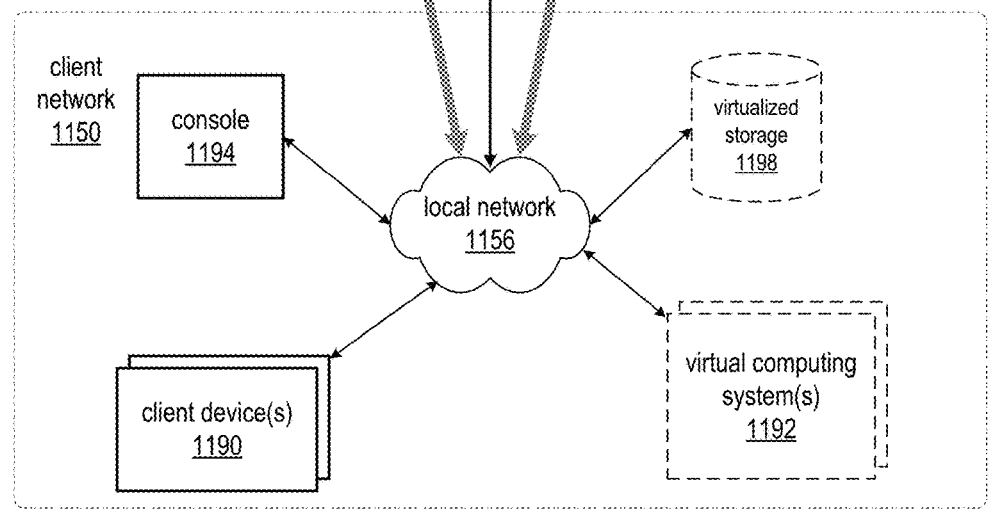

FIG. 11 is a block diagram of an example provider network that provides a storage virtualization service and a hardware virtualization service to clients, according to at least some embodiments. Hardware virtualization service 1120 provides multiple computation resources 1124 (e.g., VMs) to clients. The computation resources 1124 may, for example, be rented or leased to clients of the provider network 1100 (e.g., to a client that implements client network 1150). Each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In at least some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another client device 1190, may mount and access virtual data store 1116 volumes, which appear to the user as local virtualized storage 1198.

While not shown in FIG. 11, the virtualization service(s) may also be accessed from resource instances within the provider network 1100 via API(s) 1102. For example, a client, appliance service provider, or other entity may access a virtualization service from within a respective private network on the provider network 1100 via an API 1102 to request allocation of one or more resource instances within the private network or within another private network.

FIG. 12 illustrates an example provider network that provides private networks on the provider network to at least some clients, according to at least some embodiments. A client's virtualized private network 1260 on a provider network 1200, for example, enables a client to connect their existing infrastructure (e.g., devices 1252) on client network 1250 to a set of logically isolated resource instances (e.g., VMs 1224A and 1224B and storage 1218A and 1218B), and to extend management capabilities such as security services, firewalls, and intrusion detection systems to include their resource instances.

A client's virtualized private network 1260 may be connected to a client network 1250 via a private communications channel 1242. A private communications channel 1242 may, for example, be a tunnel implemented according to a network tunneling technology or some other technology over an intermediate network 1240. The intermediate network may, for example, be a shared network or a public network such as the Internet. Alternatively, a private communications channel 1242 may be implemented over a direct, dedicated connection between virtualized private network 1260 and client network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In at least some embodiments, either a shared network or a public network may serve as an intermediate network between a provider network and a client network.

To establish a virtualized private network 1260 for a client on provider network 1200, one or more resource instances (e.g., VMs 1224A and 1224B and storage 1218A and 1218B) may be allocated to the virtualized private network 1260. Note that other resource instances (e.g., storage 1218C and VMs 1224C) may remain available on the provider network 1200 for other client usage. A range of public IP addresses may also be allocated to the virtualized private network 1260. In addition, one or more networking devices (routers, switches, etc.) of the provider network 1200 may be allocated to the virtualized private network 1260. A private communications channel 1242 may be established between a private gateway 1262 at virtualized private network 1260 and a gateway 1256 at client network 1250.

In at least some embodiments, in addition to, or instead of, a private gateway 1262, virtualized private network 1260 may include a public gateway 1264 that enables resources within virtualized private network 1260 to communicate directly with entities (e.g., network entity 1244) via intermediate network 1240, and vice versa, instead of or in addition to via private communications channel 1242.

Virtualized private network 1260 may be, but is not necessarily, subdivided into two or more subnetworks, or subnets, 1270. For example, in implementations that include both a private gateway 1262 and a public gateway 1264, the private network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The client may assign particular client public IP addresses to particular resource instances in virtualized private network 1260. A network entity 1244 on intermediate network 1240 may then send traffic to a public IP address published by the client; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the private IP address of the resource instance.

At least some embodiments may allow a client to remap public IP addresses in a client's virtualized private network 1260 as illustrated in FIG. 12 to devices on the client's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the client network 1250. From the perspective of the network entity 1244, it appears as if the network entity 1244 is communicating with the public IP address of the client on the provider network 1200. However, the network entity 1244 has actually communicated with the endpoint on client network 1250.

While FIG. 12 shows network entity 1244 on intermediate network 1240 and external to provider network 1200, a network entity may be an entity on provider network 1200. For example, one of the resource instances provided by provider network 1200 may be a network entity that sends traffic to a public IP address published by the client.

FIG. 13 illustrates subnets and security groups in an example virtual private network implementation on a provider network, according to at least some embodiments. In at least some embodiments, a provider network such as provider network 1200 in FIG. 12 may allow the client to establish and manage virtual security groups 1316 within the client's virtual private network 1310, within or across subnets 1314. A security group 1316 acts as a virtual firewall that controls the traffic allowed to reach one or more resource instances 1318 within the security group 1316. The client may establish one or more security groups 1316 within the private network 1310, and may associate each resource instance 1318 in the private network 1310 with one or more of the security groups 1316. In at least some embodiments, the client may establish and/or modify rules for each security group 1316 that control the inbound traffic allowed to reach the resource instances 1318 associated with the security group 1316.

In the example virtual private network 1310 shown in FIG. 13, the private network 1310 is subdivided into two subnets 1314A and 1314B. Access to the private network 1310 is controlled by gateway(s) 1330. Each subnet 1314 may include at least one router 1312 that acts to route traffic to (and from) resource instances 1318 on the respective subnet 1314. In some embodiments, network access control lists (ACLs) may be used to control access to the subnets 1314 at router(s) 1312. In the example shown in FIG. 13, resource instances 1318A through 1318E are on subnet 1314A, and resource instances 1318F through 1318J are on subnet 1314B. The client has established four security groups 1316A through 1316D. As shown in FIG. 13, a security group may extend across subnets 1314, as does security group 1316A that includes resource instances 1318A and 1318B on subnet 1314A and resource instance 1318F on subnet 1314B. In addition, a resource instance 1318 may be included in two or more security groups 1316, as is resource instance 1318A which is included in security group 1316A and 1316B.

Illustrative System

In at least some embodiments, a server that implements a portion or all of the methods and apparatus for providing rating and usage models for IP traffic to and from clients' resource instances in a provider network environment as described herein may include a general-purpose computer system that includes or is configured to access one or more computer-accessible media, such as computer system 2000 illustrated in FIG. 14. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing rating and usage models for IP traffic to and from clients' resource instances in a provider network environment, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 13, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 13 for implementing embodiments of methods and apparatus for providing rating and usage models for IP traffic to and from clients' resource instances in a provider network environment. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a provider network comprising a plurality of host devices implementing a plurality of resources, wherein the provider network is configured to provide addresses from a provider network address range to the resources on the provider network;
one or more devices on the provider network, wherein each device comprises one or more hardware processors and memory, configured to:
assign one of the addresses from the provider network address range to one of the plurality of resources;
monitor network traffic to and from the address from the provider network address range assigned to the resource;
apply a first rating model to network traffic between addresses in an address range of a first network external to the provider network and the address from the provider network address range assigned to the resource, to generate provider network usage data specific to the network traffic between the addresses in the address range of the first network external to the provider network and the address from the provider network address range assigned to the resource;
apply a second rating model to network traffic between one or more other networks external to the provider network and the address from the provider network address range assigned to the resource; and
provide an indication of one or more addresses from the provider network address range to the first network external to the provider network.

2. The system as recited in claim 1, wherein the one or more devices are further configured to:
associate a subset of the addresses in the provider network address range with the address range of the first network external to the provider network; and
obtain the address to be assigned to the resource from the subset of addresses.

3. The system as recited in claim 1, wherein the resource is associated with a client of the provider network, and wherein the provider network provides a first service level to the client according to the first rating model, and provides a second service level to the client according to the second rating model.

4. The system as recited in claim 1, wherein the one or more devices are further configured to:
wherein the first network external to the provider network applies a usage model to network traffic between addresses in the address range of the first network external to the provider network and the one or more addresses from the provider network address range to generate external network usage data specific to the network traffic between the addresses in the address range of the first network external to the provider network and the one or more addresses from the provider network address range; and
wherein the external network applies a different usage model to network traffic between addresses in the address range of the first network external to the provider network and other addresses.

5. The system as recited in claim 4, further comprising one or more computing devices implementing a provider network service and an application programming interface (API) to the provider network service, wherein the one or more devices are further configured to provide the indication of the one or more addresses from the provider network address range to the first network external to the provider network according to the API.

6. The system as recited in claim 1, wherein the resource is assigned to a client of the provider network, the system further comprising one or more computing devices implementing a provider network service and an application programming interface (API) to the provider network service, wherein the provider network service is configured to receive input from the client according to the API specifying or selecting the first rating model for the client's resource.

7. A method, comprising:
assigning an address in an address range of a provider network to one of a plurality of resources on the provider network;
receiving, at a rating service implemented on one or more devices on the provider network, wherein each device comprises one or more hardware processors and memory, indications of network traffic to and from the address assigned to the resource, wherein the indications include indications of network traffic between addresses in an address range of a network external to the provider network and the address from the provider network address range assigned to the resource; and generating, by the rating service according to a rating model, provider network usage data specific to the network traffic between the addresses in the address range of the network external to the provider network and the address from the provider network address range of the resource.

8. The method as recited in claim 7, further comprising associating a subset of the addresses in the address range of the provider network with the address range of the network external to the provider network; and determining the address to be assigned to the resource from the subset of addresses associated with the address range of the network external to the provider network.

9. The method as recited in claim 7, further comprising applying one or more other rating models to network traffic between one or more other networks external to the provider network and the address of the resource.

10. The method as recited in claim 9, wherein the resources are associated with clients of the provider network, wherein the provider network provides different service levels for the clients according to the rating models, the method further comprising:

providing a first service level to the clients according to the rating model; and providing other service levels to the clients according to the one or more other rating models.

11. The method as recited in claim 10, wherein the service levels include different billing rates for the clients' network traffic on the provider network to and from the clients' respective resources.

12. The method as recited in claim 7, further comprising:

associating a subset of the addresses in the address range of the provider network with the address range of the network external to the provider network; and providing an indication of the subset of addresses to the network external to the provider network;

wherein the network external to the provider network applies a usage model to network traffic between addresses in the address range of the network external to the provider network and the addresses in the subset of addresses to generate external network usage data specific to the network traffic between the addresses in the address range of the network external to the provider network and the addresses in the subset of addresses.

13. The method as recited in claim 12, wherein the network external to the provider network applies a different usage model to network traffic between addresses in the address range of the network external to the provider network and other addresses.

14. The method as recited in claim 12, wherein said providing an indication of the subset of addresses to the network external to the provider network comprises providing the indication of the subset of addresses to the network external to the provider network according to an application programming interface (API) to a provider network service of the provider network.

15. The method as recited in claim 14, further comprising:

associating an additional subset of addresses in the address range of the provider network with the address range of the network external to the provider network;

receiving, via the API, a request from the network external to the provider network for additional subsets of addresses in the address range of the provider network; and providing an indication of the additional subset of addresses to the network external to the provider network in response to the request.

16. The method as recited in claim 12, wherein the resource is associated with a client of the provider network, the method further comprising applying the usage model to the resource in response to input from the client to an application programming interface (API) to a provider network service of the provider network.

17. The method as recited in claim 7, further comprising providing an indication of the address assigned to the resource to the network external to the provider network, wherein the network external to the provider network applies a usage model to network traffic between addresses in the address range of the network external to the provider network and the address of the resource to generate external network usage data specific to the network traffic between the addresses in the address range of the network external to the provider network and the address of the resource on the provider network, and wherein the network external to the provider network applies a different usage model to network traffic between addresses in the address range of the network external to the provider network and other addresses.

18. The method as recited in claim 7, wherein the resource is associated with a client of the provider network, the method further comprising applying the rating model to the resource in response to input from the client to an application programming interface (API) to a provider network service of the provider network.

19. The method as recited in claim 7, wherein the resource implements an application of a client of the provider network, and wherein the addresses in the address range of the network external to the provider network are user devices of users of the client's application on the resource.

20. The method as recited in claim 7, wherein the network external to the provider network is a mobile service provider network.

21. A system, comprising:

a provider network comprising a plurality of host devices implementing a plurality of resources, wherein the provider network is configured to provide addresses from a provider network address range to the resources on the provider network;

one or more computing devices on the provider network, wherein each device comprises one or more hardware processors and memory, configured to specify a usage model to a network external to the provider network, wherein, to specify the usage model the network external to the provider network, the one or more computing devices are configured to:

associate a subset of the addresses in the provider network address range with an address range of the network external to the provider network; and provide an indication of the subset of addresses to the network external to the provider network;

wherein the one or more computing devices are further configured to:

assign addresses in the subset of addresses in the address range of the provider network to specific resources on the provider network;

determine that available addresses in the subset of addresses in the address range of the provider network are at or below a threshold;

associate an additional subset of addresses in the address range of the provider network with the address range of the network external to the provider network; and provide an indication of the additional subset of addresses to the network external to the provider network;

wherein the usage model is configured to be applied by the network external to the provider network to network traffic between addresses in the address range of the network external to the provider network and addresses in the provided subsets of addresses in the provider network address range to generate external network usage data specific to the network traffic between the addresses in the address range of the network external to the provider network and the addresses in the provided subsets of addresses in the provider network address range.

22. The system as recited in claim 21, wherein the network external to the provider network applies one or more other usage models to network traffic between the addresses in the address range of the network external to the provider network and other addresses to generate external network usage data for the network traffic between the addresses in the address range of the network external to the provider network and the other addresses.

23. The system as recited in claim 22, wherein the network external to the provider network is a mobile service provider network, wherein the mobile service provider network provides a service level according to the usage model, and provides other service levels according to the one or more other usage models.

24. The system as recited in claim 21, further comprising one or more computing devices on the provider network implementing a rating service configured to apply a rating model to network traffic between the addresses in the address range of the network external to the provider network and the addresses in the subsets of addresses in the provider network address range to generate provider network usage data specific to the network traffic between the addresses in the address range of the network external to the provider network and the addresses in the subsets of addresses in the provider network address range.

25. The system as recited in claim 21, wherein the one or more computing devices are further configured to provide the indications of the subsets of addresses to the network external to the provider network according to an application programming interface (API) of a provider network service.

* * * * *